US012589579B2

(12) United States Patent
Struwe et al.

(10) Patent No.: US 12,589,579 B2
(45) Date of Patent: Mar. 31, 2026

(54) LASER ENGRAVABLE LABELS

(71) Applicant: Polyvantis GmbH, Weiterstadt (DE)

(72) Inventors: Kim Struwe, Frankfurt am Main (DE); Markus Parusel, Messel (DE); Ghirmay Seyoum, Egelsbach (DE); Claude Guénanten, Darmstadt (DE); Helmut Haering, Otzberg (DE)

(73) Assignee: Polyvantis GmbH, Weiterstadt (DE)

( * ) Notice: Subject to any disclaimer, the term of this patent is extended or adjusted under 35 U.S.C. 154(b) by 391 days.

(21) Appl. No.: 18/249,483

(22) PCT Filed: Oct. 21, 2021

(86) PCT No.: PCT/EP2021/079197
§ 371 (c)(1),
(2) Date: Apr. 18, 2023

(87) PCT Pub. No.: WO2022/090048
PCT Pub. Date: May 5, 2022

(65) Prior Publication Data

US 2023/0391057 A1 Dec. 7, 2023

(30) Foreign Application Priority Data

Oct. 26, 2020 (EP) .................................... 20203881

(51) Int. Cl.
*B32B 27/08* (2006.01)
*B29D 7/01* (2006.01)
(Continued)

(52) U.S. Cl.
CPC ............... *B32B 27/08* (2013.01); *B29D 7/01* (2013.01); *B32B 7/02* (2013.01); *B32B 7/12* (2013.01);
(Continued)

(58) Field of Classification Search
CPC .. B32B 27/08; B32B 7/02; B32B 7/12; B32B 27/20; B32B 27/308; B32B 2307/4026;
(Continued)

(56) References Cited

U.S. PATENT DOCUMENTS 8,088,847 B2 1/2012 Numrich et al.
9,987,828 B2 6/2018 Guenanten et al.
(Continued)

FOREIGN PATENT DOCUMENTS

DE 8 130 861 U1 10/1981
DE 100 48 665 A1 4/2002
(Continued)

OTHER PUBLICATIONS

WO2019057645 machine translation (Year: 2019).*
(Continued)

*Primary Examiner* — Blaine Copenheaver
(74) *Attorney, Agent, or Firm* — Oblon, McClelland, Maier & Neustadt, L.L.P.

(57) ABSTRACT

Coextruded acrylic foils made from impact-modified polyalkyl (meth)acrylates and laser engravable labels containing these foils. The coextruded acrylic foils are designed for labelling by a laser and contain a contrast layer having at least one inorganic filler and an engraving layer arranged on the contrast layer and having at least one colourant.

19 Claims, 2 Drawing Sheets

(51) Int. Cl.

| | |
|---|---|
| ***B32B 7/02*** | (2019.01) |
| ***B32B 7/12*** | (2006.01) |
| ***B32B 27/20*** | (2006.01) |
| ***B32B 27/30*** | (2006.01) |
| ***G09F 3/02*** | (2006.01) |
| ***G09F 3/10*** | (2006.01) |
| *B29K 33/00* | (2006.01) |
| *B29K 105/00* | (2006.01) |
| *B29K 507/04* | (2006.01) |
| *B29K 509/02* | (2006.01) |

(52) U.S. Cl.

CPC ............ *B32B 27/20* (2013.01); *B32B 27/308* (2013.01); *G09F 3/02* (2013.01); *G09F 3/10* (2013.01); *B29K 2033/12* (2013.01); *B29K 2105/0032* (2013.01); *B29K 2105/0044* (2013.01); *B29K 2507/04* (2013.01); *B29K 2509/02* (2013.01); *B32B 2255/26* (2013.01); *B32B 2264/025* (2013.01); *B32B 2264/1022* (2020.08); *B32B 2264/108* (2013.01); *B32B 2264/12* (2013.01); *B32B 2307/308* (2013.01); *B32B 2307/4026* (2013.01); *B32B 2307/54* (2013.01); *B32B 2307/558* (2013.01); *B32B 2307/5825* (2013.01); *B32B 2307/7376* (2023.05); *B32B 2307/748* (2013.01); *B32B 2519/00* (2013.01); *G09F 2003/0202* (2013.01); *G09F 2003/0225* (2013.01); *G09F 2003/0257* (2013.01)

(58) Field of Classification Search

CPC ........ B32B 2307/5825; B32B 2519/00; B29D 7/01; G09F 3/02; G09F 3/10

See application file for complete search history.

(56) References Cited

U.S. PATENT DOCUMENTS

| | | | | |
|---|---|---|---|---|
| 10,007,048 | B2 | 6/2018 | Schmidt et al. | |
| 11,285,708 | B2 | 3/2022 | Seyoum et al. | |
| 12,059,872 | B2 * | 8/2024 | Seyoum | B32B 29/005 |
| 2004/0209086 | A1 | 10/2004 | Koops et al. | |

FOREIGN PATENT DOCUMENTS

| | | | | |
|---|---|---|---|---|
| DE | 101 42 638 | A1 | 5/2003 | |
| EP | 3 450 163 | A1 | 3/2019 | |
| EP | 3702400 | A1 * | 9/2020 | C09J 7/25 |
| JP | 2017-111344 | A | 6/2017 | |
| JP | 2020-156955 | A | 10/2020 | |
| WO | WO 2019/057645 | A1 | 3/2019 | |
| WO | WO 2020/173686 | A1 | 9/2020 | |

OTHER PUBLICATIONS

International Search Report issued on Jan. 26, 2022 in PCT/EP2021/079197 filed on Oct. 21, 2021, 3 pages.

U.S. Appl. No. 16/636,765, filed Feb. 5, 2020, 2021/0032502 A1, Ghirmay Seyoum et al.

* cited by examiner

LASER ENGRAVABLE LABELS

CROSS REFERENCE TO RELATED APPLICATIONS

This application is a National Stage entry under 35 U.S.C. § 371 of PCT/EP2021/079197, filed on Oct. 21, 2021, and claims priority to European Patent Application No. 20203881.6, filed on Oct. 26, 2020.

FIELD OF THE INVENTION

The present invention relates to coextruded acrylic foils made from impact-modified polyalkyl (meth)acrylates and laser engravable labels comprising these foils. The coextruded acrylic foils are designed for labelling by means of a laser and comprise a contrast layer having at least one inorganic filler and an engraving layer arranged on the contrast layer and having at least one colourant. The contrast layer and the engraving layer comprise one or several impact modifiers. In a preferred embodiment, the laser engravable labels are rather brittle and therefore an unauthorised attempt to peel off the label from a substrate results in destruction of the label. Normally, the laser engravable labels have no intended break points such as slits, perforation etc.

In contrast to other commonly employed materials, the laser engravable labels of the present invention have a high softening temperature and an excellent weathering stability and, in particular, an outstanding UV stability. In some embodiments, the labels may also be designed to show an excellent chemical resistance in the presence of a variety of chemicals commonly used in the automotive area. Such labels can be used in application at temperatures of more than 100° C. without showing any signs of shrinkage in any dimension. Such applications include inter alia electronic product identification labels, labels for electronic modules such as chips, electric engines and light emitting devices, which are operated at increased temperatures, various automotive under-the-hood labels, road tax badges, document seals, labels for product theft prevention etc.

PRIOR ART

Laser engravable labels are gaining increasing importance in the area of electronics and automotive, for example as type plates, as control labels for process sequences and as warranty and test labels because they can be quickly engraved and attached to the substrate of interest in a fully automated manufacturing process. In many cases, these applications inherently require a more or less pronounced degree of protection against forgery. Typically, the bonding strength of the label to a labelled substrate is high in comparison with the strength (flexural strength or tear strength) of the label itself. Therefore, ideally, such labels cannot be peeled off from the labelled article without destroying the label.

With the help of laser engravable labels, technical information and instructions such as recommended tire pressure or type of fuel are placed on various components of motor vehicles. In addition, laser engravable labels can also contain safety information such as chassis and vehicle identification numbers, registration number etc. Corresponding labels allow conclusions to be drawn about the vehicle and production stages in its manufacture in the event of theft, illegal dumping or accident.

Laser engravable labels, which allow a high contrast of written characters are known from the prior art. For instance, DE 81 30 861 U1, DE 100 48 665 A1 and DE 101 42 638 A1 described multi-layer labels which contain a thin and a thick acrylate-based lacquer layer. During manufacturing of these labels at least two differently coloured acrylate-based layers are coated on top of one another. Before each subsequent coating step, the previously coated layer is cured and thus serves as a solid substrate for the subsequent coating. Since the corresponding manufacturing process involves several subsequent steps of coating and curing, the entire procedure requires complex equipment and suffers from a limited efficiency.

JP 2017-111344 A describes a laser engravable foil having a white layer and a back layer which can be made of various thermoplastic materials. The method of manufacturing both layers of said foil is not particularly limited and may involve e.g. extrusion or solvent coating. However, J P 2017-111344 A does not teach preparation of acrylic laser engravable foils by means of coextrusion.

WO 2019/057645 A1 describes laser engravable foils which can be manufactured by means of a coextrusion using a chill-roll process. The foils comprise an acrylic contrast layer and an acrylic engraving layer arranged on the contrast layer and are reported to have only a low shrinkage at extended temperatures. According to the teaching of WO 2019/057645 A1, either the contrast layer or the engraving layer must necessarily be free from impact modifiers to ensure a sufficient degree of brittleness. WO 2019/057645 A1 reports that the foil could be successfully coextruded using laboratory-scale equipment at an extrusion speed of 4 m/min.

Since forgery prevention labels in general and, in particular, laser engravable labels are highly brittle, their manufacturing and handling on an industrial scale is significantly more difficult than manufacturing and handling of common self-adhesive labels. For instance, if an acrylic laser engravable foil is manufactured by coextrusion, handling and use of such foil becomes problematic, since it can easily become broken or torn apart already during manufacturing.

Furthermore, laser engravable labels are typically manufactured from a label stock that comprises a face layer (facestock), an adhesive, e.g. a pressure-sensitive adhesive (PSA) layer adhered to the face layer, optionally, a release coating layer, and a support layer removably adhered to the adhesive layer or to the release coating layer. The label stock is generally provided in form of a roll. Individual laser engravable labels are usually produced by die cutting (kiss cutting) the face layer and the PSA layer, and then removing the surrounding waste matrix, leaving the individual labels adhered to the support layer. Since the material of the face layer is highly brittle, removal of the waste matrix becomes highly problematic since it can easily break or tear apart. Typical manufacturing processes for labels are run at speeds of at least 25 m/min or even higher. As the speed increases, the process becomes less stable and risk that the waste matrix breaks or tears apart upon removal increases. Slowing the process down or increasing the web width of the waste matrix to allow a better removal of the waste matrix, however, would result in a significant cost disadvantage, loss of efficiency, and may frequently be ineffective.

In principle, the problems associated with breaking or tearing apart of the waste matrix could be at least partially mitigated by increasing the distances between individual labels i.e. web width of the waste matrix. However, this would inevitably increase the amount of waste generated during the label manufacturing and diminish the process efficiency. Hence, such approach would not be feasible from economic and environmental points of view.

In house studies of the inventors showed that the foils described in WO 2019/057645 A1 are not suitable for a large-scale manufacturing at a high extrusion speed because of their high brittleness. In particular, the foil of WO 2019/057645 A1 easily tears apart already during extrusion. Investigations showed that initial cracks which are easily formed in the more brittle layer which is free of impact modifying agents subsequently propagate through the layer comprising impact modifying agents thereby leading to a complete rupture of the foil. This result is surprising, because impact modifying agents in acrylic materials typically inhibit formation and propagation of such cracks.

Technical Problem

In light of the prior art, the problem addressed by the present invention was provision of a laser engravable foil for use in laser engravable labels having a sufficient brittleness for forgery prevention applications. In particular, it was desired that such foil can be manufactured by means of coextrusion at a high extrusion speed and is usable in a cost effective manufacturing process in which individual labels are produced by kiss cutting the face layer and the PSA layer and the surrounding waste matrix is subsequently removed, leaving the individual labels adhered to the support layer. Furthermore, the desired foil should ideally show substantially no signs of shrinkage at increased temperatures.

Additionally, it was important that laser engravable labels possess a sufficiently low initial tear strength, a low tear propagation resistance and a short tear path to facilitate a complete rupture of the foil during an attempt of its non-authorised removal but, nevertheless, can be produced and processed without tearing.

In its further aspect, the present invention addressed the problem of providing self-adhesive laser engravable forgery prevention labels which can be manufactured in a highly efficient manner, are printable and suitable for a long-term outdoor use.

Finally, the present invention addressed the problem of developing a safe and a cost-efficient process for the manufacturing the laser engravable foil described above and the self-adhesive labels comprising the same.

Solution

The present invention is based on a surprising finding that mechanical stability of coextruded acrylic foils can be improved significantly by ensuring that at least the contrast layer and the engraving layer of the foil comprise at least one impact modifying agent. Because no acrylic layers having no impact modifiers are present, formation of undesired cracks propagating through the entire foil no longer takes place. Hence, coextrusion of the foil on an industrial scale at a high extrusion speed becomes possible. At the same time, brittleness of the laser engravable foil can be finely adjusted in order to prevent any unauthorised removal of the attached label from a substrate. Additionally, the inventors surprisingly found that the foils show an excellent behaviour during a die cutting (kiss cutting) process, followed by stripping of the waste matrix. Therefore, laser engravable labels comprising the foil of the present invention can be advantageously manufactured upon employing a step in which individual labels are produced by kiss cutting, and the surrounding waste matrix is subsequently removed, leaving the individual labels adhered to the support layer. No undesired breaking of the waste matrix takes place, even at running speeds of at least 25 m/min or even higher.

Hence, one aspect of the present invention relates to coextruded acrylic foil comprising a layer A and a layer B. The layer A comprises:

- from 30.0 wt.-% to 98.5 wt.-% of one or several acrylic polymers A;
- from 1.0 wt.-% to 40.0 wt.-% of one or several impact modifiers;
- from 0.5 wt.-% to 20.0 wt.-% of one or several colourants;
- from 0.0 wt.-% to 10.0 wt.-% of one or several inorganic fillers;
- from 0.0 wt.-% to 5.0 wt.-% of one or several UV-absorbers; and
- from 0.0 wt.-% to 5.0 wt.-% of one or several UV-stabilizers, based on the weight of the layer A;

wherein the cumulative content of the acrylic polymers A and the impact modifiers in the layer A is from 60.0 wt.-% to 99.5 wt.-%, based on the weight of the layer A.

The layer B comprises:

- from 10.0 wt.-% to 92.5 wt.-% of one or several acrylic polymers B;
- from 2.5 wt.-% to 35.0 wt.-% of one or several impact modifiers;
- from 5.0 wt.-% to 35.0 wt.-% of one or several inorganic fillers;
- from 0.0 wt.-% to 5.0 wt.-% of one or several UV-absorbers; and
- from 0.0 wt.-% to 5.0 wt.-% of one or several UV-stabilizers, based on the weight of the layer B;

wherein the cumulative content of the acrylic polymers B and the impact modifiers in the layer B is from 60.0 wt.-% to 95.0 wt.-%, based on the weight of the layer B.

As will be readily appreciated by a skilled person, the term “foil” as used herein, refers to a sheet having a thickness below 5 mm, more preferably, below 1 mm. Although the foil of the present invention can be advantageously used as a protective coating, the term “foil” as used in the present application should be generally distinguished from the term “coating”. A coating is typically a top layer of a multi-layer substrate and cannot be handled separately from said substrate. In contrast to a coating, the foil of the present invention is not necessarily a layer of a multi-layer article i.e. is not necessarily attached to any substrate and can therefore be separately handled and used for a variety of different purposes.

A further aspect of the present invention relates to a laser engravable label comprising at least the following layers in the order stated:

a) a layer consisting of the acrylic foil, preferably having a thickness of from 10 μm to 200 μm;
b) an adhesive layer, preferably having a thickness of from 20 μm to 30 μm;
c) a release coating layer, preferably having a thickness of from 0.6 μm to 0.8 μm; and
d) a support layer, preferably having a thickness of from 30 μm to 50 μm;

and/or the laser engravable label has a thickness of between 80 μm and 300 μm.

Yet a further aspect of the present invention relates to a laminate for the manufacturing of said laser engraving label, the laminate comprising at least the following layers:

a) a liner layer preferably having initial tear resistance of from 50 N to 500 N, measured according to ASTM D1004 (2013) with a foil having a thickness of 50.0 μm; and
b) a layer consisting of the acrylic foil.

Still a further aspect of the present invention relates to a process for the manufacturing a plurality of individual self-adhesive laser engravable labels, the process comprising at least the following steps:

i) preparation of an acrylic foil as defined above using an extruder; and
ii) optionally, binding a liner layer to the acrylic foil from the step i) downstream of the extruder, wherein a laminate is obtained;
iii) binding an adhesive layer, optionally, a release coating layer and a support layer onto the laminate from step ii), wherein a label stock is obtained;
iv) optionally, the liner layer is removed;
v) kiss cutting the label stock obtained in the step iii) and removing the resulting waste matrix, wherein a plurality of individual self-adhesive laser engravable labels on a support layer is obtained.

Finally, the present invention relates to use of the coextruded acrylic foil for the manufacturing of laser engravable labels.

a) co-extruded acrylic foil 4;
b) an adhesive layer 7;
c) optionally, a release coating layer 8, and
d) a support layer 9.

The co-extruded acrylic foil 4 comprises the layer A 5 and the layer B 6.

Figure 3:
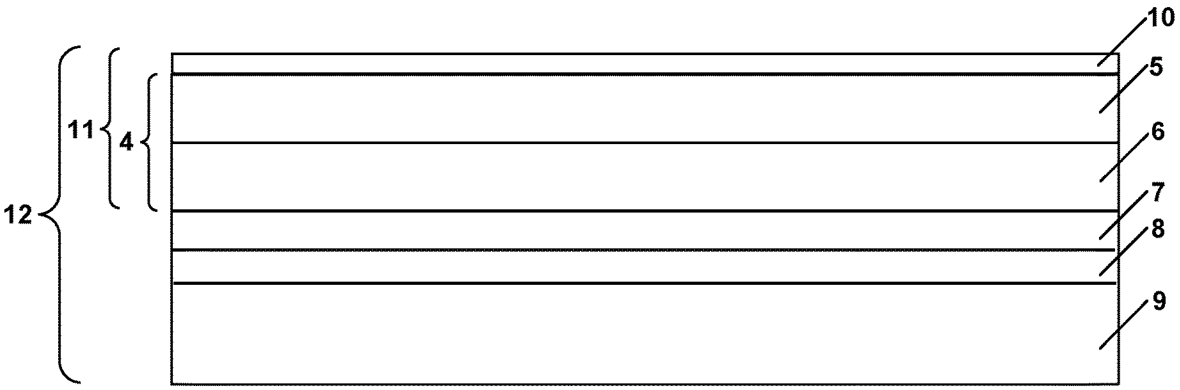

FIG. 3 side view of an endless label stock 12 before the kiss cutting process comprising at least the following layers:

a) optionally, liner layer 10;
b) co-extruded acrylic foil 4, comprising the layer A 5 and the layer B 6;
c) an adhesive layer 7;
d) optionally, a release coating layer 8, and
e) a support layer 9.

The laminate 11 typically consists of the following two layers:

the layer formed by the coextruded acrylic foil 4; and
the liner layer 10.

DETAILED DESCRIPTION

The coextruded acrylic foil of the present invention comprises at least a layer A and a layer B, wherein the layer A comprises:

from 30.0 wt.-% to 98.5 wt.-%, preferably from 40.0 wt.-% to 95.0 wt.-%, more preferably from 50.0 wt.-% to 93.0 wt.-% of an acrylic polymer A;
from 1.0 wt.-% to 40.0 wt.-%, preferably from 4.0 wt.-% to 35.0 wt.-%, more preferably from 6.0 wt.-% to 30.0 wt.-% of one or several impact modifiers;
from 0.5 wt.-% to 20.0 wt.-%, preferably from 1.0 wt.-% to 18.0 wt.-%, more preferably from 1.0 wt.-% to 15.0 wt.-% of one or several colourants;
from 0.0 wt.-% to 10.0 wt.-%, preferably from 0.0 wt.-% to 7.0 wt.-%, more preferably from 0.0 wt.-% to 5.0 wt.-% of one or several inorganic fillers;
from 0.0 wt.-% to 5.0 wt.-% of one or several UV-absorbers; and
from 0.0 wt.-% to 5.0 wt.-% of one or several UV-stabilizers, based on the weight of the layer A;

wherein the cumulative content of the acrylic polymer A and the impact modifier in the layer A is from 60.0 wt.-% to 99.5 wt.-%, preferably from 60.0 wt.-% to 99.0 wt.-%, more preferably from 65.0 wt.-% to 99.0 wt.-%, based on the weight of the layer A.

The layer B comprises:

from 30.0 wt.-% to 92.5 wt.-%, preferably from 34.0 wt.-% to 90.0 wt.-%, more preferably from 40.0 wt.-% to 85.0 wt.-% of an acrylic polymer B;
from 2.5 wt.-% to 35.0 wt.-%, preferably from 4.0 wt.-% to 33.0 wt.-%, more preferably from 6.0 wt.-% to 30.0 wt.-% of one or several impact modifiers;
from 5.0 wt.-% to 35.0 wt.-%, preferably from 6.0 wt.-% to 33.0 wt.-%, more preferably from 9.0 wt.-% to 33.0 wt.-% of one or several inorganic fillers;
from 0.0 wt.-% to 5.0 wt.-% of one or several UV-absorbers; and
from 0.0 wt.-% to 5.0 wt.-% of one or several UV-stabilizers, based on the weight of the layer B;

wherein the cumulative content of the acrylic polymer B and the impact modifier in the layer B is from 60.0 wt.-% to 95.0 wt.-%, preferably from 60.0 wt.-% to 94.0 wt.-% more preferably from 60.0 wt.-% to 91.0 wt.-%, based on the weight of the layer B.

In addition to advantages described above the inventor surprisingly found that the behaviour of the coextruded acrylic foil during extrusion on industrial scale and during the die cutting (kiss cutting) process, followed by stripping of the waste matrix, strongly depends on the ratio between the impact modifier amount and the amount of the inorganic fillers and colourants in the layers A und B of the co-extruded foil.

In particular, it was found to be advantageous in terms of mechanical properties of the coextruded acrylic foil, that the content, in wt.-%, of one or several impact modifiers $n_{imA}$ in the layer A is described by the following relationship:

$$(n_{fA}+n_{pA})\leq n_{imA}\leq 7*(n_{fA}+n_{pA})$$

$$\text{preferably } 1.2*(n_{fA}+n_{pA})\leq n_{imA}\leq 6.5*(n_{fA}+n_{pA})$$

$$\text{more preferably } 1.3*(n_{fA}+n_{pA})\leq n_{imA}\leq 6*(n_{fA}+n_{pA})$$

$n_{fA}$ being the content, in wt.-%, of one or several inorganic fillers and $n_{pA}$ being the content, in wt.-%, of one or several colourants in the layer A.

Similarly, it showed to be highly beneficial in terms of behaviour of the coextruded acrylic foil during extrusion on an industrial scale and during the die cutting (kiss cutting) process, to choose the content, in wt.-%, of one or several impact modifiers $n_{imB}$ in the layer B to be described by the following relationship:

$$0.25*n_{fB}\leq n_{imB}\leq 2*n_{fB}$$

$$\text{preferably } 0.3*n_{fB}\leq n_{imB}\leq 1.8*n_{fB}$$

$$\text{more preferably } 0.4*n_{fB}\leq n_{imB}\leq 1.5*n_{fB}$$

$n_{fB}$ being the content, in wt.-%, of one or several inorganic fillers in the layer B.

In these embodiments, laser engravable labels comprising the foil of the present invention can be manufactured upon employing a step in which individual labels are produced by kiss cutting, and the surrounding waste matrix is subsequently removed, leaving the individual labels adhered to the support layer. No undesired breaking of the waste matrix takes place, even at running speeds of at least 25 m/min or even higher.

In the present application, the content of one or several impact modifiers $n_{im}$ is the content of neat impact modifiers. Hence, if the corresponding impact modifiers are rubbery particles, $n_{im}$ is the content of the rubbery particles. If the corresponding impact modifiers are core-shell or core-shell-shell particles, $n_{im}$ is the content of the entire particles.

Hence, one embodiment of the present invention relates to a coextruded acrylic foil comprising at least a layer A and a layer B, wherein the layer A comprises:

- from 30.0 wt.-% to 98.5 wt.-% of an acrylic polymer A;
- from 1.0 wt.-% to 40.0 wt.-% of one or several impact modifiers;
- from 0.5 wt.-% to 20.0 wt.-% of one or several colourants;
- from 0.0 wt.-% to 10.0 wt.-% one or several inorganic fillers;
- from 0.0 wt.-% to 5.0 wt.-% of one or several UV-absorbers; and
- from 0.0 wt.-% to 5.0 wt.-% of one or several UV-stabilizers, based on the weight of the layer A;

wherein the cumulative content of the acrylic polymer A and the impact modifier in the layer A is from 60.0 wt.-% to 99.5 wt.-%, based on the weight of the layer A; and wherein the content, in wt.-%, of one or several impact modifiers $n_{imA}$ in the layer A is described by the following relationship:

$$(n_{fA}+n_{pA})\leq n_{imA}\leq 7*(n_{fA}+n_{pA})$$

$n_{fA}$ being the content, in wt.-%, of one or several inorganic fillers and $n_{pA}$ being the content, in wt.-%, of one or several colourants in the layer A; and the layer B comprises:

- from 30.0 wt.-% to 92.5 wt.-% of an acrylic polymer B;
- from 2.5 wt.-% to 35.0 wt.-% of one or several impact modifiers;
- from 5.0 wt.-% to 35.0 wt.-% of one or several inorganic fillers;
- from 0.0 wt.-% to 5.0 wt.-% of one or several UV-absorbers; and
- from 0.0 wt.-% to 5.0 wt.-% of one or several UV-stabilizers, based on the weight of the layer B;

wherein the cumulative content of the acrylic polymer B and the impact modifier in the layer B is from 60.0 wt.-% to 95.0 wt.-%, based on the weight of the layer B; and the content, in wt.-%, of one or several impact modifiers $n_{imB}$ in the layer B to be described by the following relationship:

$$0.25*n_{fB}\leq n_{imB}\leq 2*n_{fB}$$

$n_{fB}$ being the content, in wt.-%, of one or several inorganic fillers in the layer B.

Furthermore, the balance between suitability to a manufacturing process employing a kiss cut step, followed by a subsequent waste matrix removal, on one hand, and ability to resist a unauthorised attempt to peel off the laser engravable label from the intended substrate, on the other hand, is particularly advantageous a coextruded acrylic foil comprising at least a layer A and a layer B, wherein the layer A comprises:

- from 40.0 wt.-% to 95.0 wt.-% of an acrylic polymer A;
- from 4.0 wt.-% to 35.0 wt.-% of one or several impact modifiers;
- from 1.0 wt.-% to 18.0 wt.-% of one or several colourants;
- from 0.0 wt.-% to 7.0 wt.-% of one or several inorganic fillers;
- from 0.0 wt.-% to 5.0 wt.-% of one or several UV-absorbers; and
- from 0.0 wt.-% to 5.0 wt.-% of one or several UV-stabilizers, based on the weight of the layer A;

wherein the cumulative content of the acrylic polymer A and the impact modifier in the layer A is from 60.0 wt.-% to 99.0 wt.-%, based on the weight of the layer A; and wherein the content, in wt.-%, of one or several impact modifiers $n_{imA}$ in the layer A is described by the following relationship:

$$1.2*(n_{fA}+n_{pA})\leq n_{imA}\leq 6.5*(n_{fA}+n_{pA})$$

$n_{fA}$ being the content, in wt.-%, of one or several inorganic fillers and $n_{pA}$ being the content, in wt.-%, of one or several colourants in the layer A; and the layer B comprises:

- from 34.0 wt.-% to 90.0 wt.-% of an acrylic polymer B;
- from 4.0 wt.-% to 33.0 wt.-% of one or several impact modifiers;
- from 6.0 wt.-% to 33.0 wt.-% of one or several inorganic fillers;
- from 0.0 wt.-% to 5.0 wt.-% of one or several UV-absorbers; and
- from 0.0 wt.-% to 5.0 wt.-% of one or several UV-stabilizers, based on the weight of the layer B;

wherein the cumulative content of the acrylic polymer B and the impact modifier in the layer B is from 60.0 wt.-% to 94.0 wt.-%, based on the weight of the layer B; and the content, in wt.-%, of one or several impact modifiers $n_{imB}$ in the layer B to be described by the following relationship:

$$0.3*n_{fB}\leq n_{imB}\leq 1.8*n_{fB}$$

$n_{fB}$ being the content, in wt.-%, of one or several inorganic fillers in the layer B.

Furthermore, overall properties of the coextruded acrylic foil can be improved even further when the coextruded acrylic foil comprises at least a layer A and a layer B, wherein the layer A comprises:

- from 50.0 wt.-% to 93.0 wt.-% of an acrylic polymer A;
- from 6.0 wt.-% to 30.0 wt.-% of one or several impact modifiers;
- from 1.0 wt.-% to 15.0 wt.-% of one or several colourants;
- from 0.0 wt.-% to 10.0 wt.-%, preferably from 0.0 wt.-% to 7.0 wt.-%, more preferably from 0.0 wt.-% to 5.0 wt.-% of one or several inorganic fillers;
- from 0.0 wt.-% to 5.0 wt.-% of one or several UV-absorbers; and
- from 0.0 wt.-% to 5.0 wt.-% of one or several UV-stabilizers, based on the weight of the layer A;

wherein the cumulative content of the acrylic polymer A and the impact modifier in the layer A is from 65.0 wt.-% to 99.0 wt.-%, based on the weight of the layer A; and wherein the content, in wt.-%, of one or several impact modifiers $n_{imA}$ in the layer A is described by the following relationship:

$$1.3*(n_{fA}+n_{pA})\leq n_{imA}\leq 6*(n_{fA}+n_{pA})$$

$n_{fA}$ being the content, in wt.-%, of one or several inorganic fillers and $n_{pA}$ being the content, in wt.-%, of one or several colourants in the layer A; and the layer B comprises:

- from 40.0 wt.-% to 85.0 wt.-% of an acrylic polymer B;
- from 6.0 wt.-% to 30.0 wt.-% of one or several impact modifiers;

from 9.0 wt.-% to 33.0 wt.-% of one or several inorganic fillers;

from 0.0 wt.-% to 5.0 wt.-% of one or several UV-absorbers; and from 0.0 wt.-% to 5.0 wt.-% of one or several UV-stabilizers, based on the weight of the layer B;

wherein the cumulative content of the acrylic polymer B and the impact modifier in the layer B is from 60.0 wt.-% to 91.0 wt.-%, based on the weight of the layer B; and the content, in wt.-%, of one or several impact modifiers $n_{imB}$ in the layer B to be described by the following relationship:

$$0.4*n_{fB} \leq n_{imB} \leq 1.5*n_{fB}$$

$n_{fB}$ being the content, in wt.-%, of one or several inorganic fillers in the layer B.

Coextruded acrylic foils having a particularly low shrinkage at increased temperatures can be obtained if glass transition temperature of at least one of the acrylic polymers A and/or of at least one of the acrylic polymers B is at least 110° C., preferably at least 120° C. In this context, it was surprisingly found that even if only one of both layers A or B have a glass transition temperature of at least 110° C., preferably at least 120° C., the entire acrylic foil has a low shrinkage at increased temperatures. In other words, at increased temperatures the layer having a higher glass transition temperature provides a sufficient mechanical support to the layer with the lower glass temperature thereby avoiding undesired shrinkage of the foil.

Glass transition temperature Tg of an acrylic polymer can be determined in a known manner by means of differential scanning calorimetry (DSC). The DSC-measurements can e.g. be performed by an instrument DSC 822e obtainable from Mettler-Toledo AG according to the norm DIN EN ISO 11357. For this purpose, two cycles are performed within the interval between −80° C. and 150° C. The heating/cooling rate is preferably 10° C./min. The glass transition temperature Tg can be typically calculated by using a half-height technique in the transition region.

Alternatively, for instance if a DSC measurement is not possible, the glass transition temperature Tg can also be calculated approximately in advance by means of the Fox equation. According to Fox T. G., Bull. Am. Physics Soc. 1, 3, page 123 (1956):

$$\frac{1}{Tg} = \frac{x_1}{Tg_1} + \frac{x_2}{Tg_2} + \ldots + \frac{x_n}{Tg_n}$$

where $x_n$ is the mass fraction (% by weight/100) of the monomer n and $Tg_n$ is the glass transition temperature in kelvin of the homopolymer of the monomer n. Further helpful pointers can be found by the person skilled in the art in Polymer Handbook 2nd Edition, J. Wiley & Sons, New York (1975), which gives Tg values for the most common homopolymers.

Poly(meth)acrylimides

In one embodiment of the present invention the acrylic polymer A and/or the acrylic polymer B are independently a poly(meth)acrylimide (PMMI) comprising at least 50 wt.-%, preferably at least 60 wt.-%, most preferably at least 70 wt.-%, based on the weight of the PMMI, of repeating units of Formula (I)

(I)

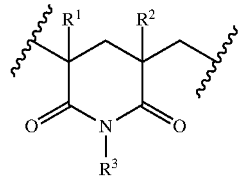

in which $R^1$ and $R^2$ are independently selected from hydrogen and a methyl group, $R^1$ and $R^2$ being preferably represented by a methyl group, and $R^3$ is hydrogen or a $C_1$-$C_4$-alkyl group, preferably a methyl group.

Preferably, the acrylic layer A and/or the acrylic layer B comprises from 30.0 wt.-% to 98.0 wt.-%, preferably from 30.0 wt.-% to 92.5 wt.-%, more preferably from 40.0 wt.-% to 80.0 wt.-%, even more preferably from 45.0 wt.-% to 75.0 wt.-% of PMMI, based on the weight of the corresponding layer A or layer B.

Preparation processes for PMMI are disclosed by way of example in EP-A 216 505, EP-A 666 161 or EP-A 776 910, the entire disclosure of which is incorporated herein by reference. The starting material used for preparation of PMMI comprises a polymer derived from alkyl esters of methacrylic acid and generally composed of more than 50.0% by weight, preferably of more than 80.0% by weight, particularly preferably of from 95.0% by weight to 100.0% by weight, of units of alkyl esters of methacrylic acid having from 1 to 4 carbon atoms in the alkyl radical. Methyl methacrylate is preferred. Preferred polymers are composed of at least 80.0% by weight, preferably of more than 90.0% by weight, particularly preferably of more than 95.0% by weight, of methyl methacrylate. Comonomers that can be used comprise any of the monomers copolymerizable with methyl methacrylate, in particular alkyl esters of acrylic acid having from 1 to 4 carbon atoms in the alkyl radical, acrylo- or methacrylonitrile, acryl or methacrylamide, styrene, or else maleic anhydride. Preference is given to thermoplastically processable polymers of this type whose reduced viscosity is in the range from 20 ml/g to 92 ml/g, preferably from 50 ml/g to 80 ml/g (measured to ISO 8257 (2006), Part 2). They are used in the form of powder or pellets whose median particle size is from about 0.03 mm to 3 mm.

It is significant that, in a step of the process, ammonia is first used as imidating agent, and that, in a subsequent step of the process, a $C_{1-4}$-alkylamine, typically methylamine is used, and that the molar ratio of ammonia used to the methylamine used is from 1:0.5 to 1:3, preferably from 1:0.8 to 1:2.7, particularly preferably from 1:0.9 to 1:1.1. Below this range, haze can occur to an increased extent in the polymethacrylimide obtained. If there is a molar excess of methylamine, based on the ammonia used, the proportion of carboxylic acid groups in the polymer in turn rises undesirably.

The reaction with the imidating agent is preferably terminated before the polymer has been completely imidated. To this end, the total amount used of the imidating agents can, for example, be from 0.2 to 2.5 mol, preferably from 0.5 to 1.5 mol, particularly preferably from 0.8 to 1.2 mol, per underlying mol of the ester units. However, the defined quantitative ratio of ammonia to methylamine is always to be maintained. This then gives polymers which are composed of from about 20 underlying mol % to 80 underlying mol % of cyclic methacrylimide units, and which have only small amounts, less than 5.0% by weight, of methacrylic acid units.

The imidation process can be carried out substantially in a manner known per se, e.g. as described in EP 441 148. The imidation proceeds best at temperatures above the melting point or at least 20° C. above the Vicat B softening point to ISO 306 (2014) for the starting polymer. It is more preferable to select a reaction temperature which is at least 20° C. above the softening point of the resultant imidated polymer. Since the Vicat softening point of the imidated polymer is generally the target variable of the process, and the degree of imidation to be achieved is defined in accordance therewith, it is likewise readily possible to determine the required minimum temperature. A temperature range of from 140° C. to 300° C. is preferred, in particular from 150° C. to 260° C., particularly preferably from 180° C. to 220° C. Excessively high reaction temperatures sometimes lead to a reduction in viscosity caused by some extent of chain termination of the polymer. In order to prevent unnecessary thermal stressing of the polymer, the reaction temperature can, for example, be raised gradually or in stages, starting from a temperature slightly above the melting point of the starting polymer, and only at a final juncture exceed the softening point of the imidated end product by at least 20° C. Within the stages of the reaction, it is preferable to operate with autogenous pressure, which can be from 50 bar to 500 bar. Depressurization can be carried out during the stages of the process, e.g. for devolatilization. The temperature of the reaction mixture can fall here and must then be increased back to the required value. If imidating agent is introduced under reaction conditions, an appropriately high pressure must, of course, be used for this purpose.

Partial or complete imidation of polymers of alkyl esters of methacrylic acid via reaction with an imidating agent, for example with a primary amine, is disclosed by way of example in U.S. Pat. No. 2,146,209. The polymer is heated to temperatures of from 140° C. to 250° C. in the presence or absence of a solvent with the imidating agent, if appropriate under pressure.

Typically, PMMIs for use in the present invention have a mass average molar weight Mw of from 80 000 g/mol to 200 000 g/mol, preferably from 90 000 g/mol to 150 000 g/mol, determined by GPC using PMMA as a standard. Such materials are commercially available from Röhm GmbH (Darmstadt, Germany) under the trademark PLEXIMID®. Suitable products include but are not limited to PLEXIMID® TT50, PLEXIMID® TT70, PLEXIMID® 8805, PLEXIMID® 8813, PLEXIMID® 8817.

Polyalkyl(meth)acrylates

In one further embodiment of the present invention the acrylic polymer A and/or the acrylic polymer B are independently polyalkyl(meth)acrylates.

Polyalkyl(meth)acrylates are usually obtained by free-radical polymerization of mixtures which typically comprise an alkyl(meth)acrylate, typically methyl methacrylate (a), and at least one further (meth)acrylate (b). These mixtures generally comprise at least 50 wt.-%, preferably at least 60 wt.-%, particularly preferably at least 80 wt.-%, and even more preferably at least 90 wt.-%, based on the weight of the monomers, of methyl methacrylate (a). The amount of methyl methacrylate (a) generally used is from 50.0 wt.-% to 99.9 wt.-%, preferably from 80.0 wt.-% to 99.0 wt.-% and particularly preferably from 90.0 wt.-% to 99.0 wt.-%, based on the weight of monomers.

These mixtures for production of polyalkyl(meth)acrylates can also comprise other (meth)acrylates (b) copolymerizable with methyl methacrylate (a). The term "(meth) acrylate" as used herein is meant to encompass methacrylates, acrylates and mixtures thereof. (Meth)acrylates may derive from saturated alcohols, e.g. methyl acrylate, ethyl (meth)acrylate, propyl (meth)acrylate, n-butyl (meth)acrylate, tert-butyl (meth)acrylate, isobutyl (meth) acrylate, pentyl (meth)acrylate and 2-ethylhexyl (meth)acrylate; or from unsaturated alcohols, e.g. allyl (meth)acrylate, vinyl (meth)acrylate; and also aryl (meth)acrylates, such as benzyl (meth)acrylate or phenyl (meth)acrylate, cycloalkyl (meth)acrylates, such as 3-vinylcyclohexyl (meth)acrylate, bornyl (meth)acrylate; hydroxyalkyl (meth)acrylates, such as 3-hydroxypropyl (meth)acrylate, 3,4-dihydroxybutyl (meth)acrylate, 2-hydroxyethyl (meth)acrylate, 2-hydroxypropyl (meth)acrylate; glycol di(meth)acrylates, such as 1,4-butanediol (meth)acrylate; amides and nitriles of (meth) acrylic acid, e.g. N-(3-dimethylaminopropyl)(meth)acrylamide, N-(diethylphosphono)-(meth)acrylamide, 1-methacryloylamido-2-methyl-2-propanol; polyfunctional (meth) acrylates, such as trimethyloylpropane tri(meth)acrylate.

The amount of the (meth)acrylic comonomers (b) generally used is from 0.1 wt.-% to 50.0 wt.-%, preferably from 1.0 wt.-% to 20.0 wt.-% and particularly preferably from 1.0 wt.-% to 10.0 wt.-%, based on the weight of monomers, and the compounds here can be used individually or in the form of a mixture.

The polymerization reaction is generally initiated by known free-radical initiators. Among the preferred initiators are inter alia the azo initiators well known to persons skilled in the art, e.g. AIBN and 1,1-azobiscyclohexanecarbonitrile, and peroxy compounds, such as methyl ethyl ketone peroxide, acetylacetone peroxide, dilauryl peroxide, tert-butyl 2-ethylperhexanoate, ketone peroxide, methyl isobutyl ketone peroxide, cyclohexanone peroxide, dibenzoyl peroxide, tert-butyl peroxybenzoate, tert-butylperoxy isopropyl carbonate, 2,5-bis(2-ethylhexanoylperoxy)-2,5-dimethylhexane, tert-butyl 2-ethylperoxyhexanoate, tert-butyl 3,5,5-trimethylperoxyhexanoate, dicumyl peroxide, 1,1-bis(tert-butylperoxy)cyclohexane, 1,1-bis(tert-butylperoxy)-3,3,5-trimethylcyclohexane, cumyl hydroperoxide, tert-butyl hydroperoxide, bis(4-tert-butylcyclohexyl) peroxydicarbonate, mixtures of two or more of the abovementioned compounds with one another and mixtures of the abovementioned compounds with compounds that have not been mentioned but which can likewise form free radicals.

The compositions to be polymerized can comprise not only the methyl methacrylate (a) and the (meth)acrylates (b) described above but also other unsaturated monomers which are copolymerizable with methyl methacrylate and with the abovementioned (meth)acrylates. Among these are inter alia 1-alkenes, such as 1-hexene, 1-heptene; branched alkenes, such as vinylcyclohexane, 3,3-dimethyl-1-propene, 3-methyl-1-diisobutylene, 4-methyl-1-pentene, norbornene; acrylonitrile; vinyl esters, such as vinyl acetate; styrene, substituted styrenes having an alkyl substituent in the side chain, e.g. α-methylstyrene and α-ethylstyrene, substituted styrenes having an alkyl substituent on the ring, e.g. vinyltoluene and p-methylstyrene, halogenated styrenes, such as monochlorostyrenes, dichlorostyrenes, tribromostyrenes and tetrabromostyrenes; vinyl ethers and isoprenyl ethers; maleic acid derivatives, such as maleic anhydride, methylmaleic anhydride, maleimide, methylmaleimide; and dienes, such as divinylbenzene.

The amount of these comonomers (c) generally used is from 0.0 wt.-% to 20.0 wt.-%, preferably from 0.0 wt.-% to 15.0 wt.-% and particularly preferably from 0.0 wt.-% to 10.0 wt.-%, based on the weight of monomers, and the compounds here can be used individually or in the form of a mixture.

Further preference is given to polyalkyl(meth)acrylates which are obtainable by polymerization of a composition having, as polymerizable constituents:

(a) from 50.0 wt.-% to 99.9 wt.-% of methyl methacrylate,
(b) from 0.1 wt.-% to 50.0 wt.-% of an acrylic acid ester of a C1-C4 alcohol,
(c) from 0.0 wt.-% to 10.0 wt.-% of monomers copolymerizable with the monomers (a) and (b).

In yet a further embodiment, preference is given to polyalkyl(meth)acrylates composed of from 85.0 wt.-% to 99.5 wt. % of methyl methacrylate and from 0.5 wt.-% to 15.0 wt.-% of methyl acrylate, the amounts here being based on 100 wt.-% of the polymerizable constituents. Particularly advantageous copolymers are those obtainable by copolymerization of from 90.0 wt.-% to 99.5 wt.-% of methyl methacrylate and from 0.5 wt.-% to 10.0 wt.-% of methyl acrylate, where the amounts are based on 100 wt.-% of the polymerizable constituents. For instance, the polyalkyl (meth)acrylates may comprise 91.0 wt.-% of methyl methacrylate and 9.0 wt.-% of methyl acrylate, 96.0 wt.-% of methyl methacrylate and 4.0 wt.-% of methyl acrylate or 99.0 wt.-% of methyl methacrylate and 1.0 wt.-% of methyl acrylate. The Vicat softening points VSP (ISO 306 (2013), method B50) of said polyalkyl(meth)acrylates is typically at least 90° C., preferably from 95° C. to 112° C.

The weight-average molar mass Mw of the polyalkyl (meth)acrylates is generally in the range from 80 000 g/mol to 300 000 g/mol. Particularly advantageous mechanical properties are obtained from foils with polyalkyl(meth) acrylates having an average molar mass Mw in the range from 80 000 g/mol to 200 000 g/mol, preferably in the range from 100 000 g/mol to 180 000 g/mol, more preferably in the range from 120 000 g/mol to 180 000 g/mol, in each case determined by means of GPC against PMMA calibration standards and THE as an eluent.

Suitable polyalkyl(meth)acrylates for use in the foils of the present invention are commercially available from Röhm GmbH (Darmstadt, Germany) under the trademark PLEXIGLAS®. Such products include but are not limited to PLEXIGLAS® 7N, PLEXIGLAS® 7H, PLEXIGLAS® 8N, PLEXIGLAS® 8H and PLEXIGLAS® Heatresist FT15.

The foil of the present invention typically comprises from 0.0 wt.-% to 30.0 wt.-%, preferably from 0.0 wt.-% to 25.0 wt.-%, more preferably from 0.0 wt.-% to 20.0 wt.-% of a polyalkyl(meth)acrylate, based on the weight of the coextruded acrylic foil.

Impact Modifiers

Impact modifiers for use in the present invention per se are well known and may have different chemical compositions and different polymer architectures. The impact modifiers may be crosslinked or thermoplastic. In addition, the impact modifiers may be in particulate form, as core-shell, as core-shell-shell or core-shell-shell-shell particles. Typically, particulate impact modifiers have an average particle diameter between 20 nm and 500 nm, preferably between 50 nm and 450 nm, more preferably between 100 nm and 400 nm and most preferably between 150 nm and 350 nm. "Particulate" in this context means crosslinked impact modifiers which generally have a core-shell, core-shell-shell or core-shell-shell-shell structure. Average particle diameter can be determined by a method known to a skilled person, e.g. by photon correlation spectroscopy according to the norm DIN ISO 13321 (2004).

In the simplest case, particulate impact modifiers are crosslinked particles obtained by means of emulsion polymerization whose average particle diameter is in the range from 10 nm to 150 nm, preferably from 20 nm to 100 nm, in particular from 30 nm to 90 nm. These are generally composed of at least 20.0 wt.-%, preferably from 20.0 wt.-% to 99.0 wt.-%, particularly preferably in the range from 30.0 wt.-% to 98.0 wt.-% of butyl acrylate, and from 0.1 wt.-% to 2.0 wt.-%, preferably from 0.5 wt.-% to 1.0 wt.-% of a crosslinking monomer, e.g. a polyfunctional (meth)acrylate, e.g. allyl methacrylate and, if appropriate, other monomers, e.g. from 0.0 wt.-% to 10.0 wt.-%, preferably from 0.5 wt.-% to 5.0% wt.-%, of $C_1$-$C_4$-alkyl methacrylates, such as ethyl acrylate or butyl methacrylate, preferably methyl acrylate, or other vinylically polymerizable monomers, e.g. styrene.

Preferred impact modifiers are polymeric particles which can have a two- or three-layer core-shell structure and are obtained by emulsion polymerization (see, for example, EP-A 0 113 924, EP-A 0 522 351, EP-A 0 465 049 and EP-A 0 683 028). The foils of present invention typically require suitable average particle diameter of these emulsion polymers in the range from 20 nm and 500 nm, preferably between 50 nm and 450 nm, more preferably between 100 nm and 400 nm and most preferably between 150 nm and 350 nm.

A three-layer or three-phase structure with a core and two shells can prepared as follows. The innermost (hard) shell can, for example, be composed in essence of methyl methacrylate, of small proportions of comonomers, e.g. ethyl acrylate, and of a proportion of crosslinking agent, e.g. allyl methacrylate. The middle (soft) shell can, for example, be composed of a copolymer comprising butyl acrylate and, if appropriate, styrene, while the outermost (hard) shell is in essence the same as the matrix polymer, thus bringing about compatibility and good linkage to the matrix.

The proportion of polybutyl acrylate in the core or in the shell of the impact modifier of a two- or three-layer core-shell structure is decisive for the impact-modifying action and is preferably in the range from 20.0 wt.-% to 99.0 wt.-%, particularly preferably in the range from 30.0 wt.-% to 98.0 wt.-%, even more preferably in the range from 40.0 wt.-% to 97.0 wt.-%, based on the total weight of the impact modifier.

In addition to particulate impact modifiers comprising copolymers of butyl acrylate, use of impact modifiers comprising siloxanes is also possible. However, use of such modifiers is less advantageous, because their presence in the coextruded acrylic foil tends to be disadvantageous for printability of the foil.

Methyl methacrylate-butadiene-styrene (MBS) core-shell impact modifiers are also highly suitable for use in the foil of the present invention because of their excellent compatibility with PMMI. The corresponding impact modifiers are commercially available from several manufacturers such as Arkema France under the trademark Clearstrength® and include products such as Clearstrength® XT100, Clearstrength® 140, Clearstrength® 223, Clearstrength® 303H, Clearstrength® 320, Clearstrength® 350, Clearstrength® 859. Equally suitable are MBS core-shell impact modifiers manufactured by The Dow Chemical Company under the trademark PARALOID™, for instance products PARALOID™ EXL-2620, PARALOID™ EXL™ 2650J, PARALOID™ EXL-2690, PARALOID™ EXL-2691, PARALOID™ EXL-2668 and PARALOID™ EXL-3361. Use of these impact modifiers allows preparation of PMMI foils with particularly low haze values and excellent optical transparency.

In some embodiments, use of core-shell-shell-shell impact modifier is advantageous in terms of mechanical properties of the foils of the present invention. The corresponding impact modifiers are described in detail in the patent application WO 2014/035608 A1, the entire disclosure of which is incorporated herein by reference.

Thermoplastic impact modifiers have a different mechanism of action than particulate impact modifiers. They are generally mixed with the matrix material. In the case that domains are formed, as occurs, for example, in the case of use of block copolymers, preferred sizes for these domains, the size of which can be determined, for example, by electron microscopy, correspond to preferred sizes for the core-shell particles.

There are various classes of thermoplastic impact modifiers. One example thereof are aliphatic TPUs (thermoplastic polyurethanes) e.g. Desmopan® products commercially available from Covestro AG. For instance, the TPUs Desmopan® WDP 85784A, WDP 85092A, WDP 89085A and WDP 89051D, all of which have refractive indices between 1.490 and 1.500, are particularly suitable as impact modifiers.

A further class of thermoplastic polymers suitable for use in the foil of the present invention as impact modifiers are methacrylate-acrylate block copolymers, especially acrylic TPE, which comprises PMMA-poly-n-butyl acrylate-PMMA triblock copolymers, and which are commercially available under the Kurarity® product name by Kuraray. The poly-n-butyl acrylate blocks form nanodomains in the polymer matrix having a size between 10 nm and 20 nm.

In addition to thermoplastic impact modifiers described above, use of thermoplastic impact modifiers comprising PVDF is also possible. However, use of such modifiers is less advantageous, because their presence in the coextruded acrylic foil tends to worsen printability of the foil.

The cumulative content of the poly(meth)acrylimides, polyalkyl(meth)acrylates and the impact modifiers in the layer A (hereinafter referred to as "impact-modified acrylic polymers A") is usually adjusted to be from 60 wt.-% to 99.5 wt.-%, more preferably from 70.0 wt.-% to 98.0 wt.-%, more preferably from 80.0 wt.-% to 96.0 wt.-%, based on the weight of the layer A. The cumulative content of the poly(meth)acrylimides, polyalkyl(meth)acrylates and the impact modifiers in the layer B (hereinafter referred to as "impact-modified acrylic polymers B") is usually adjusted to be from 60 wt.-% to 95.0 wt.-%, more preferably from 65.0 wt.-% to 95.0 wt.-%, more preferably from 70.0 wt.-% to 90.0 wt.-%, based on the weight of the layer B.

Inorganic Fillers

Presence of inorganic fillers in the coextruded acrylic foil of the present invention serves several purposes. Presence of inorganic fillers allows rendering the coextruded acrylic foil to have a desired colour and degree of transparency. For instance, presence of titanium dioxide in the coextruded acrylic foil renders the foil white and substantially non-transparent. Additionally, the amount of inorganic filler was surprisingly found to have a strong effect on the foil behaviour during its handling, in particular, on behaviours of the foil during coextrusion on industrial scale and behaviour of the waste matrix after the kiss cutting step during manufacturing of laser engravable labels.

Inorganic fillers in the layers A and B are not particularly limited and can be independently selected from zirconium dioxide, titanium dioxide, preferably rutile-type titanium dioxide, silica, preferably fused silica, barium sulphate, aluminium trihydroxide, mica, zinc oxide, zinc sulphide, clay, muscovite and calcium carbonate.

Ideally, the inorganic fillers show a 45 μm screen residue of not more than 0.1 wt.-%, i.e. substantially no agglomerates with a particle size larger than 45 μm are present, which is highly advantageous for use according to the present invention. This allows the inorganic filler to be distributed in the matrix of poly(meth)acrylate foil in a particularly homogeneous manner without large filler agglomerates being present so that the resulting foil shows a substantially uniform visual appearance and has appropriate mechanical properties. Generally speaking, the presence of substantial amounts of larger filler agglomerates in the foil is disadvantageous, since such agglomerates tend to initiate foil cracks thereby reducing the initial tear strength at a random position of the foil.

In a preferred embodiment, the inorganic fillers have a weight-average particle diameter $d_{50}$ ranging between 0.05 μm and 10.0 μm, more preferably between 0.1 μm and 5.0 μm, particularly preferably between 0.1 μm and 1.0 μm, even more preferably between 0.1 μm and 0.5 μm. The weight-average particle diameter $d_{50}$ can be determined by an appropriate method known to a skilled person, e.g. by photon correlation spectroscopy according to the norm DIN ISO 13321 (2004) upon using a commercially available instrument such as N5 Submicron Particle Size Analyzer from Beckman Coulter Inc or, for particles having a size of more than 1.0 μm, by static light scattering using an instrument such as SZ-10 Nanoparticle Analyzer from Horiba Scientific Ltd.

To ensure a particularly homogeneous dispersibility of inorganic filler particles in the poly(meth)acrylate-based matrix material it is further advantageous that the oil absorption of the inorganic filler is not less than 5 g/100 g filler, preferably not less than 10 g/100 g filler and particularly preferably not less than 15 g/100 g filler. It is further beneficial that the oil absorption of the inorganic filler is not more than 100 g/100 g filler, preferably not more than 70 g/100 g filler and particularly preferably not more than 50 g/100 g filler. The oil absorption can be determined according to the norm DIN EN ISO 787-5 (1995).

For instance, if a white colouring of the layer B is desired, titanium dioxide can be favourably employed as a filler. Typically, titanium dioxide in form of rutile or anatase may be used, whereby titanium dioxide in form of rutile is particularly preferred due to its low photocatalytic activity. Such materials can be manufactured by chloride process and are commercially available from various suppliers such as e.g. KRONOS TITAN GmbH (Leverkusen, Germany).

Suitable titanium dioxide fillers may be with or without modifications with water-insoluble oxides of aluminium, silicon, zinc, or other agents; these reagent materials are introduced specifically to improve those properties for which the colourant is used. The titanium dioxide fillers should ideally be free of extenders such as barium sulphate, clay, magnesium silicate, whiting, etc. Particularly preferred are titanium dioxide fillers of types II, III and IV according to the classification ASTM D476 (2015).

The layer B usually comprises from 5.0 wt.-% to 35.0 wt.-%, preferably from 7.5 wt.-% to 32.5 wt.-%, more preferably from 10.0 wt.-% to 30.0 wt.-%, based on the weight of the layer B.

Colourants

Colourants for use in the layer A of the foil are not particularly limited. In one preferred embodiment, the colourant is a pigment. In some embodiments, the layer A of the films can be coloured in black. Suitable pigments for this purpose can, for instance, the selected from carbon black, iron oxide, particularly iron (III) oxide, cobalt oxide, aniline black and perylene black, carbon black being particularly suitable. In other embodiments, a red coloured the layer A can be prepared by using at least one red pigments. Suitable red pigments include but are not limited to (colour index C.I.) Pigment Red (PR) 48:2, 48:3, 57:1, 101, 112, 122, 144, 166, 168, 178, 179, 202, 214, 254, 255, 264, 272, 276, 277 and Pigment Violet (PV) 19.

The concentration of the pigment in the layer A mainly depends on the desired L*-value in CIELAB 1976 colour space. The concentration is generally in the range from 0.5 to 20.0 wt.-% preferably from 1.0 to 10.0 wt.-%, more preferably from 1.5 to 7.0 wt.-%, based on the weight of the layer A.

Average primary particle size of carbon black pigment is normally in the range from 5.0 to 100.0 nm, more preferably from 7.0 to 60.0 nm. Average particle size $d_{50}$ can be determined by a method known to a skilled person, e.g. by photon correlation spectroscopy according to the standard DIN ISO 13320 (2004) upon using a commercially available instrument such as LS 13 320 Laser Diffraction Particle Size Analyzer from Beckman Coulter Inc. It further showed to be advantageous in terms properties of the foil to select carbon black particles having a specific surface area, measured by BET method, standard ISO 9277, of from 50 to 500 $m^2/g$, for instance from 70 to 400 $m^2/g$. The carbon black can be treated or untreated. For example, the carbon black can be treated with specific gases or organic substances, such as, for example, butyllithium. Such treatment allows the surface to be modified or functionalised. This can additionally promote compatibility with the polymeric matrix of the layer A.

Carbon blacks suitable for use of the foil of the present invention differ from so-called conductive blacks in that they have only low or no electrical conductivity. Compared with the carbon blacks used here, conductive blacks have specific morphologies and superlattices in order to achieve high conductivity. By contrast, carbon black particles used here can very readily be dispersed in thermoplastics so that virtually no cohesive regions of carbon black occur, from which a corresponding conductivity might result. Suitable carbon blacks are obtainable commercially under a large number of trade names and in a large number of forms, such as pellets or powder. For example, suitable carbon blacks are obtainable under the trade names BLACK PEARLS®, in the form of wet-processed pellets under the names ELFTEX®, REGAL® and CSX®, and in a flocculent form under the names MONARCH®, ELFTEX®, REGAL® and MOGUL®—all obtainable from Cabot Corporation. Printex® 60, and Printex® 90 (Orion Engineered Carbons GmbH) are also suitable for this purpose.

In a further preferred embodiment, the colourant in the layer A is a dye. Suitable dyes include in particular red dyes i.e. those designated as Solvent Red, Acid Red or Modern Red according to the colouring index (C.I.). Examples thereof include anthraquinone dyes such as Solvent Red 111, 143, 145, 146, 150, 151, 155, 168, 169, 172, 175, 181, 207, 222, 227, 230, 245, 247; perinone dyes such as Solvent Red 135, 162, 179; as well as monoazo dyes such as Solvent Red 195.

UV Absorbers and UV Stabilizers

UV absorbers and UV stabilizers for use in the foil of the present invention are well known and described in detail by way of example in Hans Zweifel, Plastics Additives Handbook, Hanser Verlag, 5th Edition, 2001, p. 141 ff. UV stabilizers are understood to include UV stabilizers and free-radical scavengers.

UV absorbers can by way of example derive from the group of the substituted benzophenones, salicylic esters, cinnamic esters, oxanilides, benzoxazinones, hydroxyphenylbenzotriazoles, triazines or benzylidenemalonate. The best-known representatives of the UV stabilizers/free-radical scavengers are provided by the group of the sterically hindered amines (hindered amine light stabilizer, HALS).

Advantageously, the combination of UV absorbers and UV stabilizers as used in the coextruded acrylic foil is composed of the following components:

component A: a UV absorber of benzotriazole type, component B: a UV absorber of triazine type, component C: a UV stabilizer (HALS compound).

The individual components can be used in the form of an individual substance or in a mixture.

Benzotriazole type UV absorbers are known in the prior art and are typically 2-(2'-hydroxyphenyl)benzotriazoles. The corresponding compounds include in particular 2-(2'-hydroxy-5'-methylphenyl)-benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chloro-benzotriazole, 2-(3'-tert-butyl-2'-hydroxy-5'-methylphenyl)-5-chloro-benzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis-(α,α-dimethylbenzyl)-2'-hydroxyphenyl)benzotriazole, 2-(3'-tert-butyl-2'-hydroxy-5'-(2-octyloxycarbonylethyl)phenyl)-5-chloro-benzotriazole, 2-(3'-tert-butyl-5'-[2-(2-ethylhexyloxy)-carbonylethyl]-2'-hydroxyphenyl)-5-chloro-benzotriazole, 2-(3'-tert-butyl-2'-hydroxy-5'-(2-methoxycarbonylethyl)phenyl)-5-chloro-benzotriazole, 2-(3'-tert-butyl-2'-hydroxy-5'-(2-metH-oxycarbonylethyl)phenyl)benzotriazole, 2-(3'-tert-butyl-2'-hydroxy-5'-(2-octyloxycarbonyl-ethyl)phenyl)benzotriazole, 2-(3'-tert-butyl-5'-[2-(2-ethylhexyloxy)carbonylethyl]-2'-hydroxy-phenyl)benzotriazole, 2-(3'-dodecyl-2'-hydroxy-5'-methylphenyl)benzotriazole, 2-(3'-tert-butyl-2'-hydroxy-5'-(2-isooctyloxy-carbonylethyl)phenylbenzotriazole, 2,2'-methylene-bis[4-(1,1,3,3-tetramethylbutyl)-6-benzotriazole-2-ylphenol]; the transesterification product of 2-[3'-tert-butyl-5'-(2-methoxy-carbonylethyl)-2'-hydroxyphenyl]-2H-benzotriazole with polyethylene glycol 300; [R—$CH_2CH_2$—COO—$CH_2CH_2$—, where R=3'-tert-butyl-4'-hydroxy-5'-2H-benzo-triazol-2-ylphenyl, 2-[2'-hydroxy-3'-(α,α-dimethylbenzyl)-5'-(1,1,3,3-tetramethylbutyl)-phenyl]-benzotriazole; 2-[2'-hydroxy-3'-(1,1,3,3-tetramethylbutyl)-5'-(α,α-dimethylbenzyl)-phenyl]benzotriazole. Further examples of UV absorbers of benzotriazole type that can be used are 2-(2-hydroxy-5-methylphenyl)benzotriazole, 2-[2-hydroxy-3,5-di(α,α-dimethylbenzyl)phenyl]benzotriazole, 2-(2-hydroxy-3,5-di-tert-butylphenyl)benzotriazole, 2-(2-hydroxy-3,5-butyl-5-methylphenyl)-5-chlorobenzotriazole, 2-(2-hydroxy-3,5-di-tert-butylphenyl)-5-chlorobenzotriazole, 2-(2-hydroxy-3,5-di-tert-amylphenyl)benzotriazole, 2-(2-hydroxy-5-tert-butylphenyl)benzotriazole, 2-(2-hydroxy-3-sec-butyl-5-tert-butylphenyl)benzotriazole and 2-(2-hydroxy-5-tert-octylphenyl)benzotriazole, phenol, 2,2'-methylenebis[6-(2H-benzotriazol-2-yl)-4-(1,1,3,3-tetramethylbutyl)].

These compounds are commercially available from BASF SE (Ludwigshafen, Germany) e.g. as Tinuvin® 360 and Tinuvin® 234.

The amounts used of the UV absorbers of benzotriazole type are from 0.1 wt.-% to 5.0 wt.-%, preferably from 0.2 wt.-% to 3.0 wt.-% and very particularly preferably from 0.5 wt.-% to 2.0 wt.-%, based on the weight of the coextruded acrylic foil. It is also possible to use mixtures of different UV absorbers of benzotriazole type.

Triazine type UV absorbers are typically 2-(2-hydroxyphenyl)-1,3,5-triazines. Preferably used 2-(2-hydroxyphenyl)-1,3,5-triazines include inter alia 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyl-oxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropoxy)phenyl]-4,6-bis(2,4-dimethyl)-1,3,5-triazine, 2-[2-hydroxy-4-(2-hydroxy-3-octyloxypropyloxy)phenyl]-4,6-bis(2,4-dimethyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]-4,6-bis(2,4-dimethylphenyl)-1,3,5-triazine, 2-(2-hydroxy-4-hexyloxy)phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine, 2,4-bis(4-[2-ethylhexyloxy]-2-hydroxyphenyl)-6-(4-methoxyphenyl)-1,3,5-triazine. Triazine type UV absorbers such as 2-(4,6-diphenyl-1,3,5-triazin-2-yl)-5-hexyloxyphenol, can also be used.

These compounds are e.g. commercially available from BASF SE (Ludwigshafen, Germany) under trademarks Tinuvin® 1600, Tinuvin® 1577 or Tinuvin® 1545.

The amounts of the triazine type UV absorber are from 0.1 to 5.0 wt.-%, preferably from 0.2 to 3.0 wt.-% and very particularly preferably from 0.5 to 2.0 wt.-%, based on the weight of the foil. It is also possible to use mixtures of different triazine type UV absorbers.

The foil of the present invention may further contain one or more UV stabilisers which typically act as antioxidants, radical scavengers, etc. Particularly preferred UV stabilisers are sterically hindered phenols and HALS type additives.

Sterically hindered amines, HALS (Hindered Amine Light Stabilizer) UV stabilizers are per se known. They can be used to inhibit ageing phenomena in paints and plastics, especially in polyolefin plastics (Kunststoffe, 74 (1984) 10, pp. 620-623; Farbe+Lack, Volume 96, 9/1990, pp. 689-693). The tetramethylpiperidine group present in the HALS compounds is responsible for the stabilizing effect. This class of compound can have no substitution on the piperidine nitrogen or else substitution by alkyl or acyl groups on the piperidine nitrogen. The sterically hindered amines do not absorb in the UV region. They scavenge free radicals that have been formed, whereas the UV absorbers cannot do this. Examples of HALS compounds which have stabilizing effect and which can also be used in the form of mixtures are: bis(2,2,6,6-tetramethyl-4-piperidyl) sebacate, 8-acetyl-3-dodecyl-7,7,9,9-tetramethyl-1,3,8-triazaspiro(4,5)-decane-2,5-dione, bis(2,2,6,6-tetramethyl-4-piperidyl) succinate, poly(N-β-hydroxyethyl-2,2,6,6-tetramethyl-4-hydroxypiperidine succinate) or bis(N-methyl-2,2,6,6-tetramethyl-4-piperidyl) sebacate.

These compounds are e.g. commercially available from BASF SE (Ludwigshafen, Germany) under trademarks Tinuvin® 123, Tinuvin® 144 or Tinuvin® 292.

The amounts used of the HALS compounds in the foil are typically from 0.0 to 5.0 wt.-%, preferably from 0.1 to 3.0 wt.-% and very particularly preferably from 0.2 to 2.0 wt.-%, based on the weight of the foil. It is also possible to use mixtures of different HALS compounds.

Sterically hindered phenols are also suitable for use in the foil of the present invention. Preferred sterically hindered phenols include inter alia 6-tert-butyl-3-methylphenyl derivatives, 2,6-di-tert-butyl-p-cresol, 2,6-tert-butyl-4-ethyl phenol, 2,2'-methylenebis-(4-ethyl-6-tert-butyl phenol), 4,4'-butylidenebis(6-tert-butyl-m-cresol), 4,4'-thiobis(6-tert-butyl-m-cresol), 4,4'-dihydroxy diphenyl cyclohexane, alkylated bisphenol, styrenated phenol, 2,6-di-tert-butyl-4-methyl phenol, n-octadecyl-3-(3',5'-di-tert-butyl-4'-hydroxy phenyl)propionate, 2,2'-methylenebis(4-methyl-6-tert-butyl phenol), 4,4'-thiobis(3-methyl-6-tert-butylphenyl), 4,4'-butylidenebis(3-methyl-6-tert-butylphenol), stearyl-β(3,5-di-4-butyl-4-hydroxy phenyl)propionate, 1,1,3-tris(2-methyl-4-hydroxy-5-tert-butylphenyl)butane, 1,3,5-trimethyl-2,4,6-tris(3-5-di-tert-butyl-4hydroxybenzyl) benzene, tetrakis-[methylene-3(3',5'-di-tert-butyl-4'-hydroxyphenyl)propionate]methane. Commercially available sterically hindered phenols include Sumilizer™ BHT BP-76, WXR, GA-80 and BP-101 (Sumitomo Chemical, Osaka, Japan), Irganox® 1076, 565, 1035, 1425WL, 3114, 1330 and 1010 (BASF SE, Ludwigshafen, Germany), MARK AO-50, -80, -30, -20, -330 and -60 (ADEKA Polymer Addtives, Mulhouse, France), and Tominox® SS, TT (Mitsubishi Chemical Corporation, Yoshitomi, Japan).

Generally speaking, the foil of the present invention usually comprises from 0.0 wt.-% to 5.0 wt.-%, of one or several UV-absorbers and from 0.0 wt.-% to 5.0 wt.-% of one or several UV-stabilizers, based on the weight of the coextruded acrylic foil.

Coextruded Acrylic Foil

To serve the desired purpose in an optimal way, the coextruded acrylic foil of the present invention preferably has tensile strength of from 20.0 MPa to 70.0 MPa, measured according to DIN EN ISO 527-3/2/100 (2003) with a foil having a thickness of 50.0 μm. Although the foil having a tensile strength lower than 20.0 MPa still would be suitable for use according to the present invention, a great attention would need to be taken during its manufacturing and handling, since the foil can easily tear apart.

On the other hand, although the coextruded acrylic foil of the present invention having tensile strength of more than 70.0 MPa is highly suitable for the manufacturing process of laser engravable labels, use of such labels could bear an increased risk that such label can be removed using a thin sharp blade (e.g. a razor blade) from the originally labelled substrate and subsequently re-attached onto a different substrate.

From the standpoint of having a good balance between the handling and brittleness of the foil, the initial tear resistance is preferably in the range of from 1.0 N to 15.0 N. The tensile strength of the coextruded acrylic foil can be determined by a common method known to a skilled person such as the method described in the standard DIN EN ISO 527-3/2/100 (2003) and is typically measured in the direction of extrusion.

Preferably, the coextruded acrylic foil has resistance to tear propagation, measured according to ASTM D1938 (2014) with a foil having a thickness of 50.0 μm, of from 0.01 N to 1.50 N, preferably from 0.1 N to 1.00 N. The resistance to tear propagation is typically measured in the direction of extrusion.

Furthermore, to ensure an optimal balance between processability of the coextruded acrylic foil and the ability of the final laser engravable labels to withstand non-authorised removal attempts, it is preferable that the coextruded acrylic foil has elongation at break ranging between 0.5% to 30%, measured according to DIN EN ISO 527-3/2/100 (2003) with a foil having a thickness of 50.0 μm, whereby elongation at break ranging between 2.0% to 20.0% is particularly advantageous in terms of handling.

If the elongation at break is less than 2.0%, flexibility of the foil is excessively small, so that handling of the foil becomes difficult and great care should be taken during manufacturing to avoid damaging the foil. Under these circumstances, the manufacturing process may need to be run at a lower speed. On the other hand, when the elongation at break exceeds 30.0%, brittleness of the foil tends to decrease. Therefore, during an attempt to remove the laser engravable label with a thin sharp blade a minor mechanical deformation of the foil may not necessarily lead to its complete rupture. This increases the risk that a skilled and experienced individual using a sufficiently thin and sharp tool may succeed in removing the laser engravable label from the original substrate (e.g. a replaceable part for a vehicle engine) in order to re-attach it to a different object (a non-genuine replaceable part). The elongation at break of the coextruded acrylic foil can be measured by a common method known to a skilled person such as the one described in the standard DIN EN ISO 527-3/2/100 (2003).

According to the present invention, there are also various influencing factors which, by being varied, allow the skilled person to adjust elongation at break of the foil of the present invention in the desired direction.

The major influencing factors are the amounts of impact modifiers and inorganic fillers. More particularly, an increase in concentration of the impact modifiers also increases the elongation at break, and therefore smaller amounts of impact modifiers contribute to a low elongation at break in accordance with the invention.

In one preferred embodiment, the initial tear resistance of the coextruded acrylic foil is at least 10 times as high, preferably at least 50 times as high, even more preferably at least 100 times as high as resistance to tear propagation. This is particularly advantageous and ensures that even a minor foil rupture occurring during an unauthorised attempt to remove the laser engravable label from a substrate rapidly propagates through the entire label and results in a complete label destruction. This additionally reduces the risk of an unauthorised label removal.

In one embodiment, the dimensional stability of an extruded foil of the present invention at 120° C. (60 minutes) is not higher than 0.7%, preferably not higher than 0.5% in the machine direction orientation (direction of extrusion) and not higher than 0.5%, preferably not higher than 0.3% in the transverse direction (direction perpendicular to the machine direction).

The dimensional stability can be measured according to the norm DIN EN ISO 11501 (2004) using a foil having a thickness of 50.0 μm. The measurements can be carried out at 120° C. over a period of 30 minutes.

Furthermore, the foil of the present invention has an excellent chemical resistance in the presence of common chemicals such as disinfectants, detergents and various fluids commonly used in road vehicles such as hydraulic fluid, engine oil etc. For this reason, the foils are highly suitable for use as automotive under-the-hood labels.

The thickness of the coextruded acrylic foil of the present invention is preferably in the range of 10.0 μm to 200.0 μm. When the thickness is below 10.0 μm, a great care should be taken during manufacturing and handling of the foil to avoid its rupture. On the other hand, when the foil thickness exceeds 200.0 μm, its mechanical stability is rather high and this, again, increases the risk that the foil does not break during an attempt of an unauthorised label removal. Additionally, a high foil thickness will result in a high thickness of the laser engravable label comprising the same, which may be disadvantageous for aesthetical or other reasons. From the standpoint of having a good balance between the handling and flatness, the thickness of the coextruded acrylic foil is preferably in the range of 30.0 μm to 90.0 μm, a range of 40.0 μm to 75.0 μm being even more preferred.

Typically, the layer A has a thickness $d_A$ of from 2 μm to 100 μm, preferably from 5 μm to 90 μm, more preferably from 10 μm to 80 μm. The layer B has normally a thickness $d_B$ of from 5 μm to 100 μm, preferably from 10 μm to 90 μm, more preferably from 20 μm to 80 μm.

The thickness of the foil of the present invention and of its individual layers A and B can be determined by mechanical scanning according to the norm ISO 4593 (1993). Preferably, however, the thickness of the foil of the present invention is determined using photomicrographs obtained using a scanning electron microscope such as JEOL JSM-IT300 (commercially available from JEOL GmbH, Freising, Germany). For this purpose, the foil samples can be frozen in liquid nitrogen, mechanically broken and the freshly obtained surfaces are analysed. For example, the measurement can be carried out using the following parameters:

Current source: variable flow of electrons from a tungsten filament (cathode)
Vacuum system: rotary pump/oil diffusion pump
X-Y-Z-rotation-tilt: totally motorized
Working distance (WD): 5 to 70 mm (common: 10 mm)
Sample rotation: 360°
Sample tilting: −5 to max. 90° (depending on WD)
Magnification: 10× to 300 000×
Maximum resolution: ~3 nm
Detectors: Secondary Electrons (SE)
  Back Scattered Electrons (BSE, 5 segments)
  Energy dispersive X-Ray Analysis (EDS)

Detailed Configuration of a Line Preferably Used for Producing the Foils of the Present Invention The acrylic foil used in accordance with the invention is preferably produced by means of a coextrusion process. In contrast to a foil produced by a solution coating process, a coextruded acrylic foil is substantially free of volatile organic compounds such as solvents, which is highly advantageous for toxicological and environmental reasons. The individual components of the layers A and B of the coextruded acrylic foil can be blended before or even during the extrusion step.

For extrusion of the coextruded acrylic foil, a line having at least the following components can be used:

- an extruder,
- optionally, a melt pump,
- an optional melt filtration facility,
- an optional static mixing element,
- a flat foil die,
- a polishing stack or chill roll, and
- a winder.

In the method of the invention, a hot melt is extruded from the die of the extruder onto a nip between two polishing rolls or onto a chill roll. The optimum melt temperature is dependent, for example, on the composition of the mixture and may therefore vary within wide ranges. Preferred temperatures of the moulding composition up to the point of die entry are in the range from 170° C. to 320° C., more preferably in the range from 200° C. to 290° C. and very preferably in the range from 220° C. to 280° C. The temperature of the polishing rolls is preferably less than or equal to 150° C., more preferably between 60° C. and 140° C.

In one embodiment, the temperature of the die is higher than the temperature of the mixture prior to die entry. The die temperature is preferably set 10° C., more preferably 20° C. and very preferably 30° C. higher than the temperature of the mixture prior to die entry. Accordingly, preferred temperatures of the die are in the range from 160° C. to 330° C., more preferably 190° C. to 300° C.

The polishing stack may consist of two or three polishing rolls. Polishing rolls are widely known in the art and are used to obtain a high gloss. Nevertheless, rolls other than polishing rolls e.g. matt rolls can also be used in the method of the invention. The nip between the first two polishing rolls forms a sheet which becomes a foil by virtue of the simultaneous cooling.

The chill rolls used alternatively are also known to the skilled person. Here, the sheet of melt may be deposited onto a single cooled roll, which transports it further. Chill rolls are preferably located over the polishing stacks. Alternatively, the extrusion can be carried out in a particularly advantageous way using equipment described in patent applications US 2016/015 9995 A1 and US 2017/030 6188 A1, the entire disclosure of which is incorporated herein by reference. Particularly good surface quality of the foil can be ensured by the die and roll having chrome surfaces, and especially by these chrome surfaces having a roughness Ra (according to DIN 4768 (1990)) of less than 0.10 μm, preferably less than 0.08 μm.

To ensure that that the coextruded acrylic foil is substantially free from impurities, a filter may be optionally located before the entry of the melt into the die. The mesh size of the filter is guided generally by the starting materials used, and may therefore vary within wide ranges. Mesh sizes generally are in the range from 300 μm to 20 μm. Filters having two or more screens of different mesh size may also be located before the point of die entry. These filters are available commercially. To obtain foils of high quality, it is advantageous, moreover, to use particularly pure raw materials.

Optionally, furthermore, a static mixing element may be installed upstream of the flat foil die. This mixing element can be used to mix components such as colourants, stabilizers or additives into the polymer melt, or up to 5 wt % of a second polymer, for example in the form of a melt, may be mixed from a second extruder into the material.

The pressure with which the melted mixture is pressed into the die may be controlled, for example, via the speed of the screw. The pressure is typically within a range of from 40 bar to 300 bar, without this limiting the method of the invention. Accordingly, the speed with which the foils can be obtained in accordance with the invention is generally greater than 5 m/min, more particularly greater than 10 m/min.

In order to ensure a particularly uniform conveying of the melt, a melt pump may additionally be installed upstream of the flat foil die.

In order to additionally improve handling of the coextruded acrylic foil of the present invention, it is advantageous that a liner layer 10 is bound to the coextruded acrylic foil 4 from the step i) downstream of the extruder at a temperature below the glass transition temperature of the employed acrylic polymers, whereby a laminate 11 is obtained.

The resulting laminate 11 will typically consist of the following two layers (cf. FIG. 3):

layer formed by the coextruded acrylic foil 4; and
a liner layer 10.

In one embodiment, the liner layer 10 is self-adhesive. Alternatively, the liner layer 10 may have an adhesive layer and can be advantageously used for binding the liner layer 10 to a coextruded acrylic foil 4 having a matt surface. In yet a further embodiment, the liner layer 10 may have a layer of a polyethylene-copolymer instead of an adhesive layer. Such liners are advantageously employed for coextruded acrylic foils 4 having a glossy surface.

In order to ensure a good mechanical stability and, in particular, a high tear strength of the laminate 11, it is advantageous that the liner layer 10 preferably has an initial tear resistance, measured according to ASTM D1004 (2013), of from 50 N to 500 N. The material of the liner layer 10 is not particularly limited, as long as the liner layer 10 has a sufficient tear resistance and can be selected from one of the following: polyethylene, polypropylene, polyimide, polyethylene terephthalate and polyethylene naphthalate, preferably a biaxially oriented polypropylene or a biaxially oriented polyethylene terephthalate or mixtures thereof, whereby a biaxially oriented polypropylene or a biaxially oriented polyethylene terephthalate are particularly preferred.

In the subsequent process steps, the laminate 11 will undergo a step of binding an adhesive layer 7, optionally, a release coating layer 8 and a support layer 9 to deliver a label stock 12 (FIG. 3).

These process steps are well-known to a skilled person and are explained in detail e.g. in patent applications US 2004/0091657 A1 and US 2011/0132522 A1.

In one preferred embodiment, the process comprising at least the following steps:

i) preparation of a coextruded acrylic foil 4 according to at least one of Claims 1 to 9 using an extruder; and
ii) binding a liner layer 10 to the coextruded acrylic foil 4 from the step i) downstream of the extruder.

Subsequently, the laminate 11 obtained in step ii) can be passed between a plurality of rolls, wherein at least a roll facing towards the side of the coextruded acrylic foil 4 is a cooled roll.

Alternatively, the process may comprise at least the following steps:

i) preparation of a coextruded acrylic foil according to at least one of Claims 1 to 9 using an extruder;
ii) coextruded acrylic foil obtained in step i) is passed between a plurality of rolls, wherein at least one roll is a cooled roll; and
iii) binding a liner layer to the coextruded acrylic foil from the step ii).

Typically, the adhesive layer 7 substantially consists of a pressure sensitive adhesive (PSA). The support layer typically comprises a paper or plastic foil material and may be coated by a release coating layer 8. Various release coating compositions are known such as those described U.S. Pat. No. 6,406,787. Non-PSA adhesive compositions may also be used particularly for embodiments wherein the form support layer is porous (e.g. paper), the form substrate being exposed on the non-viewing surface of the label.

PSAs suitable in the present invention are preferably selected from the group consisting of alkylacrylate polymers and copolymers; copolymers of alkylacrylates with acrylic acid; terpolymers of alkylacrylates, acrylic acid, and vinyllactates; alkyl vinyl ether polymers and copolymers; polyisoalkylenes; polyalkyldienes; alkyldiene-styrene copolymers; styrene-isoprene-styrene block copolymers; polydialkylsiloxanes; polyalkylphenylsiloxanes; natural rubbers; synthetic rubbers; chlorinated rubbers; latex crepe; rosin; cumarone resins; alkyd polymers; and polyacrylate esters and mixtures thereof. Examples include polyisobutylenes, polybutadienes, or butadiene-styrene copolymers, and mixtures thereof (such polymers and copolymers preferably have no reactive moieties, i.e. are not oxidized in the presence of air); silicone-based compounds such as polydimethylsiloxane, and polymethylphenylsiloxane combined with other resins and/or oils.

Other suitable PSAs also include tackified thermoplastic resins and tackified thermoplastic elastomers, wherein the tackifier comprises one or more compounds which increases the tack of the composition. An example of a tackified thermoplastic resin useful as an aggressively PSA is the combination of a vinyl acetate/ethylene copolymer known under the trade designation VYNATHENE EY 902-30 (available from Quantum Chemicals, Cincinnati, Ohio) with substantially equal portions of the tackifiers known under the trade designations PICCOTEX LC (a water-white thermoplastic resin produced by copolymerization of vinyltoluene and alpha-methylstyrene monomers having a ring and ball softening point of about 87° C. to 95° C., available from Hercules Incorporated, Wilmington, Del.) and WINGTACK 10 (a liquid aliphatic C-5 petroleum hydrocarbon resin available from Goodyear Chemical) and an organic solvent such as toluene. An example of a tackified thermoplastic elastomer useful as an aggressively PSA is the combination of the styrene-poly(ethylene-butylene)-styrene block copolymer known under the trade designation KRATON G1657 (available from of Shell Chemicals) with one or more of the low molecular weight hydrocarbon resins known under the trade designation REGALREZ (from Hercules) and an organic solvent such as toluene. Both of these formulations may be coated using a knife coater and air-dried, or air-dried followed by oven drying. Of course, the invention is not limited to use of these specific combinations of thermoplastic resins, thermoplastic elastomers, and tackifiers.

Some presently preferred PSAs exhibit extended shelf life and resistance to detackifying under atmospheric conditions, and include acrylic-based copolymer adhesives as disclosed in U.S. Pat. No. Re 24,906. One example of such an acrylic-based copolymer is a 95.5:4.5 (measured in parts by weight of each) isooctylacrylate/acrylic acid copolymer. Another preferred adhesive is the copolymer of a 90:10 weight ratio combination of these two monomers. Yet other preferred adhesives are terpolymers of ethyl acrylate, butyl acrylate, and acrylic acid; copolymers of isooctylacrylate and acrylamide; and terpolyrmers of isooctylacrylate, vinylacetate, and acrylic acid.

Acrylic-based PSAs can be coated out of a coatable composition comprising an organic solvent, such as a heptane:isopropanol solvent mixture, and the solvent subsequently evaporated, leaving a pressure-sensitive adhesive coating. This layer is preferably from about 0.038 centimeters (cm) to about 0.11 cm (5 to 15 mils) thick when the substrate is a retroreflective sheeting material.

PSAs useful in the invention also may be characterized by having 1800 peel adhesion ranging from about 10 to about 1000 g/cm, more preferably at least about 50 g/cm. For aggressive PSAs the 1800 peel adhesion typically ranges from about 200 g/cm to about 600 g/cm, measured using a standard test procedure. In this procedure, the force necessary to remove (i.e. peel) a PSA-coated substrate from a test substrate when the PSA-coated substrate is peeled from the test substrate is termed the "peel adhesion" value. A standard glass plate is cleaned using a solvent (such as one wash of diacetone alcohol followed by three washes of n-heptane). With very light tension, a sample having a PSA-backsize coating is then applied along the center of the standard glass plate, PSA side down. The sample is then rolled once with a 2.04 kg hand roller. The standard glass plate is then secured to a horizontal plate in a standard peel adhesion tester such as that known under the trade name "IMASS." One end of the sample is then attached to a hook which is a part of the peel adhesion tester. The sample is peeled from the standard glass plate at a 180° angle (i.e., one end of the sample is pulled toward the other end) by moving the platen horizontally at a speed of 228.6 cm/min, and the force required recorded, in g/cm of sample width, for various dwell times.

The release coating layer 8, which is typically a siloxane coating, serves the purpose of reducing the adhesion between the adhesive layer 7 and the support layer 9. Typically, the release coating layer 8 allows to achieve a kinetic coefficient of friction below 0.35, preferably below 0.25, determined according to the norm ASTM D1894 (2014).

Finally, the label stock 1 will undergo a kiss cutting to form a plurality of individual self-adhesive laser engravable labels 2 bound to a support layer 9. The kiss cutting may be performed by means of a mechanical die cutting as described in US 2011/0132522 A1 or by using a laser. In the subsequent step, the waste matrix 3 surrounding the individual self-adhesive laser engravable labels 2 will be peeled off from the support layer 9 without any risk of rupture.

To minimise a waste formation, the distance between individual labels (i.e. the width of the stripes in the waste matrix) is kept in the range of from 1.0 mm to 10.0 mm, more preferably from 2.0 mm to 8.0 mm, even more preferably from 3.0 mm to 5.0 mm. As explained above, no undesired waste matrix rupture takes place. Typically, the release force during this operation is below 30 g/inch, preferably below 20 g/inch, even more preferably from 1 g/inch to 10 g/inch, measured using T-peel test with a Tesaband® 7475 tape from tesa SE (Norderstedt, Germany).

Laser Engravable Labels

Figure 1:
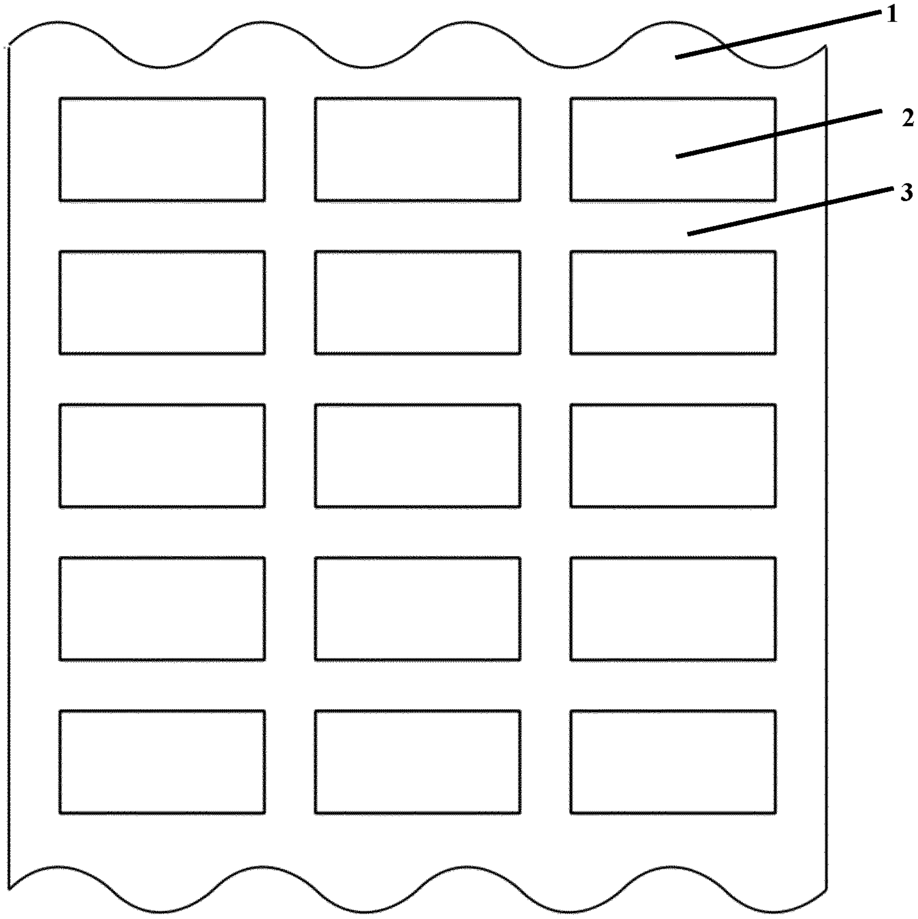
FIG. 1 schematic representation of an endless label stock 1 after a kiss cutting process. In a subsequent process step the waste matrix 3 is removed from the support layer thereby leaving a plurality of individual laser engravable labels 2 attached to the support layer.
Figure 2:
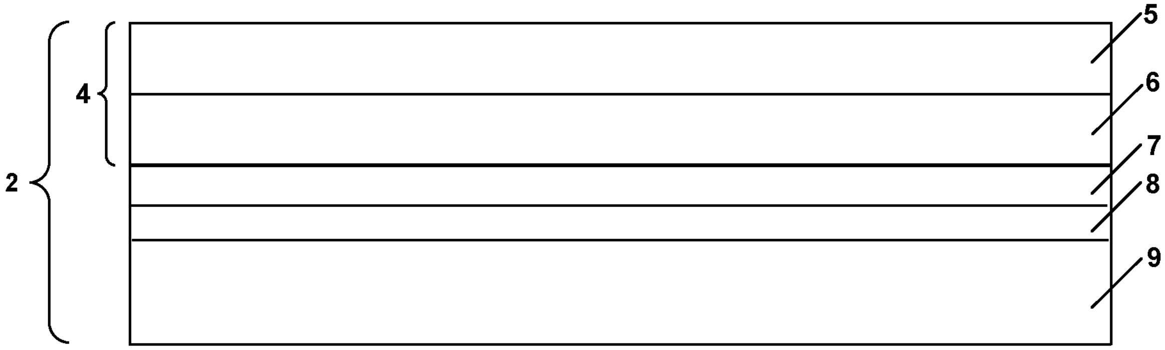
FIG. 2 side view of a laser engravable label 2 comprising at least the following layers.

Laser engravable label 2 of the present invention comprise at least the following layers in the order stated (cf. FIG. 2):

a) a layer consisting of coextruded acrylic foil 4 as described above;
b) an adhesive layer 7;
c) a release coating layer 8, and
d) a support layer 9.

Typically, the laser engravable label the present invention has a thickness of between 50.0 μm and 300.0 μm, more preferably between 100.0 μm and 200.0 μm.

In a typical embodiment, the layer 4 (coextruded acrylic foil) may have a thickness of from 10.0 μm to 200.0 μm, more preferably of from 30 μm to 150 μm, even more preferably of from 40.0 μm to 100.0 μm;

the adhesive layer 7 may have a thickness of from 10.0 μm to 40.0 μm, more preferably of from 20.0 μm to 30.0 μm;

the release coating layer 8 may have a thickness of from 0.01 μm to 1.5 μm, preferably of from 0.5 μm to 1.2 μm, more preferably of 0.6 μm to 0.8 μm; and the support layer 9 may have a thickness of from 20.0 μm to 70.0 μm, preferably of from 30.0 μm to 50.0 μm;

The size of the laser engravable labels can in principle be freely selected and is only limited by the dimension extrusion die and/or the polishing stack used for their production. This means that the formats are substantially freely selectable.

The trimming and kiss cutting of the coextruded acrylic foil is preferably accomplished by means of die cutting, cutting, laser cutting or laser die cutting. Particular preference is given to laser cutting or laser die cutting.

Optionally, but not necessarily, the coextruded acrylic foils produced in accordance with the invention may be provided additionally with ridges, cuts, slits or perforation or notches in order to additionally facilitate destruction of the labels during an attempt of their non-authorised removal. However, such additional means are not essential.

The laser engravable labels are highly suitable for producing electronic product identification label, automotive under-the-hood label, chip cards, heat resistant documents and seals. One illustrative example of the use is that, for example, barcode labels on various parts of an automotive engine. The labels can withstand operating temperatures of the engine without any noticeable shrinkage and are also chemically resistant to fluids such as brake fluid, hydraulic fluid, engine oil etc. The label will become destroyed upon an unauthorised attempt to peel it off from an engine part in order to transfer it to a replaceable non-genuine engine part.

As a further example, the labels of the present invention can bear a vehicle identification number and can be advantageously used under the hood of a vehicle. An unauthorised attempt to remove the label from a vehicle in order to attach it to a different vehicle will result in label destruction.

EXPERIMENTAL PART

Examples 1-25

The foils comprising layers A and B were produced by adapter co-extrusion using chill-roll process at the extrusion speed of 7.3 m/min using a 35 mm-diameter single screw extruder and a 25 mm-diameter single screw co-extruder from Dr. Collin GmbH (Ebersberg, Germany) under the following conditions:

Screw temperature in the extruder: 240° C. to 270° C.

Die temperature: 240° C. to 285° C.

Temperature of the melt at the die: 240° C. to 285° C.

Roll temperature: 50° C. to 120° C.

Alternatively, production of foils can be achieved by way of a multiple-manifold co-extrusion process or a combination of adapter and multiple-manifold co-extrusion.

The pigment used in the layer A was carbon black FW1 (Pigment Black 7), available from The Cary Company, Addison, USA.

As a filler titanium dioxide (rutile) having density (DIN EN ISO 787-10) of 4.0 g/cm$^3$ and oil absorption (DIN EN ISO 787-5)* of 17 g/100 g titanium dioxide was used, available from KRONOS TITAN GmbH, Germany.

Acrylic polymer 1 mentioned in examples below was PMMI PLEXIMID® TT50, available from Röhm GmbH, Darmstadt, Germany.

Acrylic polymer 2 mentioned in the examples below was a copolymer of 99 wt.-% methyl methacrylate and 1 wt.-% methyl acrylate with mass average molecular weight Mw of 110 000 g/mol (determined by means of GPC against a PMMA standard), available from Röhm GmbH, Darmstadt, Germany.

Acrylic polymer 3 mentioned in the examples below was a copolymer of 96 wt.-% methyl methacrylate and 4 wt.-% methyl acrylate with mass average molecular weight Mw of 155 000 g/mol (determined by means of GPC against a PMMA standard), available from Röhm GmbH, Darmstadt, Germany.

Acrylic polymer 4 mentioned in the examples below was a copolymer of 75 wt.-% of MMA, 15 wt.-% of styrene and 10 wt.-% of maleic anhydride. The weight-average molar mass Mw of this copolymer was about 140 000 g/mol (determined by means of GPC against a PMMA standard).

Impact modifier 1 was ACRYPET™ IR 441, available from Mitsubishi Chemical Co, Japan.

Impact modifier 2 was Paraloid™ EXL-2688, available from Dow Chemical Co, United States.

Impact modifier 3 was a butylacrylat-based acrylic core-shell-shell impact modifier.

The foil can be used for the manufacturing of self-adhesive laser engravable labels. No undesired rupture of the waste matrix takes place.

The composition and layer thickness of foils of Examples 1-25 is summarised in Table 1 below:

TABLE 1

Composition and layer thickness of foils of Examples 1-25

| | Layer A | | | | Layer B | | | |
|---|---|---|---|---|---|---|---|---|
| | Acrylic polymer, wt.-% | Impact modifier, wt.-% | Pigment, wt.-% | Layer thickness | Acrylic polymer, wt.-% | Impact modifier, wt.-% | Filler, wt.-% | Layer thickness |
| Ex. 1 | polymer 1, 85.0% | modifier 1, 10.0% | 5.0% | 15 μm | polymer 1, 55.0% | modifier 1, 25.0% | 20.0% | 45 μm |
| Ex. 2 | polymer 1, 85.0% | modifier 2, 10.0% | 5.0% | 15 μm | polymer 1, 55.0% | modifier 2, 25.0% | 20.0% | 45 μm |
| Ex. 3 | polymer 1, 70.0% | modifier 2, 25.0% | 5.0% | 15 μm | polymer 1, 67.5% | modifier 2, 12.5% | 20.0% | 45 μm |
| Ex. 4 | polymer 1, 70.0% | modifier 2, 25.0% | 5.0% | 20 μm | polymer 1, 55.0% | modifier 2, 25.0% | 20.0% | 40 μm |
| Ex. 5* | polymer 4, 95.0% | | 5.0% | 15 μm | polymer 4, 55.0% | modifier 1, 25.0% | 20.0% | 45 μm |
| Ex. 6* | polymer 4, 85.0% | modifier 1, 10.0% | 5.0% | 15 μm | polymer 4, 55.0% | | 20.0% | 45 μm |
| Ex. 7 | polymer 4, 85.0% | modifier 1, 10.0% | 5.0% | 15 μm | polymer 4, 55.0% | modifier 1, 25.0% | 20.0% | 45 μm |
| Ex. 8 | polymer 4, 70.0% | modifier 1, 25.0% | 5.0% | 15 μm | polymer 4, 67.5% | modifier 1, 12.5% | 20.0% | 45 μm |
| Ex. 9 | polymer 4, 70.0% | modifier 1, 25.0% | 5.0% | 15 μm | polymer 4, 55.0% | modifier 1, 25.0% | 20.0% | 45 μm |
| Ex. 10 | polymer 2, 75.0% polymer 3, 10.6% | modifier 3, 9.4% | 5.0% | 15 μm | polymer 2, 40.0% polymer 3, 21.2% | modifier 3, 18.8% | 20.0% | 45 μm |
| Ex. 11 | polymer 2, 65.0% polymer 3, 15.9% | modifier 3, 14.1% | 5.0% | 15 μm | polymer 3, 64.57% | modifier 3, 14.1% | 21.33% | 45 μm |
| Ex. 12 | polymer 2, 55.0% polymer 3, 21.2% | modifier 3, 18.8% | 5.0% | 15 μm | polymer 3, 64.57% | modifier 3, 14.1% | 21.33% | 45 μm |
| Ex. 13 | polymer 2, 70.0% polymer 3, 13.25% | modifier 3, 11.75% | 5.0% | 15 μm | polymer 2, 55.0% polymer 3, 13.25% | modifier 3, 11.75% | 20.0% | 45 μm |

TABLE 1-continued

Composition and layer thickness of foils of Examples 1-25

| | Layer A | | | | Layer B | | | |
|---|---|---|---|---|---|---|---|---|
| | Acrylic polymer, wt.-% | Impact modifier, wt.-% | Pigment, wt.-% | Layer thickness | Acrylic polymer, wt.-% | Impact modifier, wt.-% | Filler, wt.-% | Layer thickness |
| Ex. 14 | polymer 2, 70.0% polymer 3, 13.25% | modifier 3, 11.75% | 5.0% | 15 μm | polymer 2, 30.0% polymer 3, 26.5% | modifier 3, 23.5% | 20.0% | 45 μm |
| Ex. 15 | polymer 2, 70.0% polymer 3, 13.25% | modifier 3, 11.75% | 5.0% | 25 μm | polymer 2, 30.0% polymer 3, 26.5% | modifier 3, 23.5% | 20.0% | 50 μm |
| Ex. 16 | polymer 1, 85.0% | modifier 1, 10.0% | 5.0% | 15 μm | polymer 4, 55.0% | modifier 1, 25.0% | 20.0% | 45 μm |
| Ex. 17 | polymer 1, 85.0% | modifier 2, 10.0% | 5.0% | 15 μm | polymer 4, 55.0% | modifier 1, 25.0% | 20.0% | 45 μm |
| Ex. 18 | polymer 1, 85.0% | modifier 1, 10.0% | 5.0% | 15 μm | polymer 2, 40.0% polymer 3, 21.2% | modifier 3, 18.8% | 20.0% | 45 μm |
| Ex. 19 | polymer 1, 85.0% | modifier 2, 10.0% | 5.0% | 15 μm | polymer 2, 40.0% polymer 3, 21.2% | modifier 3, 18.8% | 20.0% | 45 μm |
| Ex. 20 | polymer 1, 85.0% | modifier 2, 10.0% | 5.0% | 15 μm | polymer 3, 64.57% | modifier 3, 14.1% | 21.33% | 45 μm |
| Ex. 21 | polymer 1, 70.0% | modifier 2, 25.0% | 5.0% | 15 μm | polymer 2, 55.0% polymer 3, 13.25% | modifier 3, 11.75% | 20.0% | 45 μm |
| Ex. 22 | polymer 1, 70.0% | modifier 2, 25.0% | 5.0% | 15 μm | polymer 2, 30.0% polymer 3, 26.5% | modifier 3, 23.5% | 20.0% | 45 μm |
| Ex. 23 | polymer 2, 75.0% polymer 3, 10.6% | modifier 3, 9.4% | 5.0% | 15 μm | polymer 4, 55.0% | modifier 1, 25.0% | 20.0% | 45 μm |
| Ex. 24 | polymer 1, 85.0% | modifier 1, 10.0% | 5.0% | 15 μm | polymer 1, 35.0% polymer 2, 5.0% polymer 3, 21.2% | modifier 3, 18.8% | 20.0% | 45 μm |
| Ex. 25 | polymer 1, 85.0% | modifier 2, 10.0% | 5.0% | 15 μm | polymer 1, 35.0% polymer 2, 5.0% polymer 3, 21.2% | modifier 3, 18.8% | 20.0% | 45 μm |

*comparative example

Evaluation of Mechanical Properties

Mechanical properties of the foils were measured using a testing system Zwick Roell Z005, available from Zwick GmbH & Co. KG (Ulm, Germany) with 4 identical samples, wherein 5 tests were carried out for each sample. Before measuring all samples were conditioned for at least 16 h at 23° C. and 50% relative humidity.

Tensile strength and elongation at break were measured according to DIN EN ISO 527-3 (2019) at 100 mm/min.

Initial tear resistance was measured according to ASTM D 1004/-/51 (2013) at 51 mm/min (initial grip separation 25.4 mm). The normed tear resistance was calculated by dividing the initial tear resistance with the thickness of the specimen, therefore small differences in thickness are ruled out, to make samples more comparable.

Tear Propagation forces were measured according to ASTM D 1938 (2019). In this case the above conditioning was over 40 hours before testing.

The foils of Example 5 and 6 comprised no impact modifiers in one of both layers and therefore illustrate the teaching of WO 2019/057645 A1. These foils were found to be highly brittle and, because of a difficult handling, they were not suitable for manufacturing on an industrial scale.

In contrast to foils of Examples 5 and 6, the foils of the present invention had an advantageous combination of mechanical properties for use a laser engravable label.

TABLE 2

Mechanical properties of foils of Examples 1-25

| | Initial tear resistance, N | Normed tear resistance, N/mm | Average tear propagation force, N | Tear initiation force, N | Maximal tear propagation force, N | Tensile strength, MPa | Elongation at break, % |
|---|---|---|---|---|---|---|---|
| Ex. 1 | 3.6 | 55.2 | | | | 51.3 | 11.00% |
| Ex. 2 | 4.3 | 69.7 | | | | 50.3 | 14.60% |
| Ex. 3 | 7.3 | 116.5 | 0.04 | 0.01 | 0.07 | 53.7 | 5.10% |
| Ex. 4 | 11.3 | 162.5 | 0.09 | 0.01 | 0.12 | 50.1 | 26.20% |
| Ex. 5* | 0 | 0 | | | | 29.1 | 3.40% |
| Ex. 6* | 0 | 0 | | | | 30.8 | 0.95% |
| Ex. 7 | 2.6 | 39.9 | | | | | 4.50% |
| Ex. 8 | 5 | 67.4 | 0.05 | 0.02 | 0.09 | 34.95 | 4.00% |
| Ex. 9 | 4.9 | 65.7 | 0.04 | 0 | 0.07 | 47.5 | 5.30% |
| Ex. 10 | 4.9 | 74 | | | | 49.3 | 7.40% |
| Ex. 11 | | | | | | 57.3 | 5.90% |
| Ex. 12 | 4.5 | 70.2 | | | | 55.8 | 6.70% |
| Ex. 13 | 6.1 | 84.4 | 0.05 | 0.02 | 0.08 | 57.5 | 5.70% |
| Ex. 14 | 8 | 107.6 | 0.07 | 0.02 | 0.1 | 52.9 | 17.20% |
| Ex. 15 | 8.7 | 109.1 | 0.08 | 0.02 | 0.1 | 55.0 | 8.40% |
| Ex. 16 | | | | | | 59.9 | 7.20% |
| Ex. 17 | | | | | | 58.8 | 7.40% |
| Ex. 18 | | | | | | 57.7 | 6.70% |
| Ex. 19 | | | | | | 63.3 | 7.90% |
| Ex. 20 | 6.3 | 97.1 | | | | 57.5 | 6.00% |
| Ex. 21 | 10 | 137.6 | 0.06 | 0.01 | 0.09 | 57.7 | 9.60% |

TABLE 2-continued

| Mechanical properties of foils of Examples 1-25 | | | | | | | |
|---|---|---|---|---|---|---|---|
| | Initial tear resistance, N | Normed tear resistance, N/mm | Average tear propagation force, N | Tear initiation force, N | Maximal tear propagation force, N | Tensile strength, MPa | Elongation at break, % |
| Ex. 22 | 8.6 | 123.9 | 0.07 | 0.02 | 0.1 | 47.4 | 17.50% |
| Ex. 23 | | | | | | 47.3 | 4.70% |
| Ex. 24 | 5.3 | 80.4 | | | | 57.5 | 7.60% |
| Ex. 25 | 4.6 | 72.3 | | | | 62.5 | 7.60% |

*comparative example

TABLE 3

| Shrinkage of foils in percent [%] at increased temperature | | | | | | | | | | |
|---|---|---|---|---|---|---|---|---|---|---|
| | 1 h at 120° C. | | 1 h at 130° C. | | 1 h at 140° C. | | 1 h at 150° C. | | 1 h at 160° C. | |
| | extrusion direction | transverse direction | extrusion direction | transverse direction | extrusion direction | transverse direction | extrusion direction | transverse direction | extrusion direction | transverse direction |
| Ex. 1 | 0.0 | 0.0 | 0.3 | 0.4 | 0.0 | 0.4 | 0.3 | 0.5 | 0.5 | 1.4 |
| Ex. 2 | 0.4 | 0.2 | 0.3 | 0.3 | 0.5 | 0.4 | 0.6 | 0.1 | 1.2 | 0.4 |
| Ex. 5* | 0.0 | 0.4 | 0.3 | 0.2 | 0.7 | 0.1 | 7.0 | 1.6 | 8.7 | 1.6 |
| Ex. 6* | 0.0 | 0.0 | 0.1 | 0.1 | 0.4 | 0.3 | 5.9 | 1.1 | 7.7 | 1.1 |
| Ex. 7 | 0.3 | 0.0 | 0.5 | 0.3 | 2.4 | 1.0 | 6.9 | 2.0 | 9.0 | 2.1 |
| Ex. 10 | 0.3 | 0.9 | 4.8 | 1.0 | 9.2 | 1.5 | 12.7 | 1.7 | 15.9 | 1.2 |
| Ex. 11 | 1.9 | 0.3 | 4.9 | 1.6 | 6.2 | 1.9 | 8.9 | 2.0 | 11.3 | 1.9 |
| Ex. 12 | 3.9 | 1.3 | 6.0 | 1.8 | 6.7 | 1.9 | 12.8 | 1.7 | 14.5 | 1.7 |
| Ex. 16 | 0.3 | 0.0 | 0.3 | 0.2 | 0.6 | 0.2 | 1.8 | 0.2 | 1.3 | 0.6 |
| Ex. 17 | 0.0 | 0.1 | 0.2 | 0.2 | 0.3 | 0.4 | 1.3 | 0.4 | 1.2 | 0.4 |
| Ex. 18 | 0.0 | 0.2 | 0.1 | 0.6 | 0.1 | 0.6 | 1.7 | 0.5 | 1.8 | 0.1 |
| Ex. 19 | 0.2 | 0.1 | 0.3 | 0.2 | 0.3 | 0.2 | 0.4 | 0.9 | 0.3 | 1.2 |
| Ex. 20 | 0.2 | 0.2 | 0.4 | 0.1 | 0.5 | 0.3 | 0.8 | 0.1 | 1.0 | 0.2 |
| Ex. 23 | 0.1 | 0.1 | 0.4 | 0.2 | 0.9 | 0.6 | 6.2 | 1.8 | 7.8 | 1.8 |
| Ex. 24 | 0.0 | 0.0 | 0.1 | 0.2 | 0.2 | 0.3 | 0.3 | 0.2 | 0.5 | 0.3 |
| Ex. 25 | 0.1 | 0.1 | 0.2 | 0.1 | 0.3 | 0.2 | 0.2 | 0.4 | 0.3 | 0.7 |

*comparative example

Evaluation of Shrinkage at Increased Temperatures

The shrinkage of the samples was measured at 120° C., 130° C., 140° C., 150° C. and 160° C. (60 minutes) according to standard DIN 53377 (2015) in extrusion direction and transverse direction. Materials having a high shrinkage at increased temperatures are usually not suitable for labelling parts of a vehicle which can reach such temperature.

Foils of Examples 1 and 2 comprised PMMI as acrylic polymer in layers A and B and therefore, as expected, had a rather low shrinkage in extrusion direction, even at a temperature of 160° C. Foils of Examples 11 and 12 comprised a blend of polymethyl methacrylates with a relatively low heat resistance in both layers. Therefore, these foils had a high shrinkage at temperatures above or at 130° C. Foils of Examples 5, 6, 7 and 23 comprised a copolymer of MMA, styrene and maleic anhydride. This material had a relatively high heat resistance so that the foils had a low shrinkage at temperatures below 140° C. At a higher temperature a considerable shrinkage in extrusion direction took place.

The foils of Examples 16-19 comprised PMMI in one of both layers, the other layer comprising polymethyl methacrylates having a low heat resistance. Surprisingly, presence of PMMI in only one or both layers was sufficient to ensure that the foils had only a moderate shrinkage at increased temperatures.

The invention claimed is:

1. A coextruded acrylic foil comprising a layer A and a layer B, wherein the layer A comprises:

from 30.0 wt. % to 98.5 wt. % of an acrylic polymer A;
from 1.0 wt. % to 40.0 wt. % of an impact modifier;
from 0.5 wt. % to 20.0 wt. % of a colourant;
from 0.0 wt. % to 10.0 wt. % of an inorganic filler;
from 0.0 wt. % to 5.0 wt. % of a UV absorber;
and from 0.0 wt. % to 5.0 wt. % of a UV stabilizer, based on the weight of the layer A;
wherein a cumulative content of the acrylic polymer A and the impact modifier in the layer A is from 60.0 wt. % to 99.5 wt. %, based on the weight of the layer A; and the layer B comprises:

from 30.0 wt. % to 92.5 wt. % of an acrylic polymer B;
from 2.5 wt. % to 35.0 wt. % of an impact modifier;
from 5.0 wt. % to 35.0 wt. % of an inorganic filler;
from 0.0 wt-% to 5.0 wt. % of a UV absorber; and
from 0.0 wt. % to 5.0 wt. % of a UV stabilizer, based on the weight of the layer B;
wherein cumulative content of the acrylic polymer B and the impact modifier in the layer B is from 60.0 wt. % to 95.0 wt., based on the weight of the layer B;

wherein the content, in wt. %, of the impact modifier $n_{imA}$ in the layer A is described by the following relationship:

$$(n_{fA}+n_{pA}) \leq n_{imA} \leq 7*(n_{fA}+n_{pA})$$

$n_{fA}$ being the content, in wt. %, of the inorganic filler and $h_{pA}$ being the content, in wt. %, of the colourant in the layer A; and the content, in wt. %, of the impact modifier $n_{imB}$ in the layer B being satisfied by the following relationship:

$$0.25*n_{fB}<n_{imB}<2*n_{fB}$$

$n_{fB}$ being the content, in wt. %, of the inorganic filler in the layer B.

2. The coextruded acrylic foil according to claim 1, wherein a glass transition temperature of the acrylic polymer A, the acrylic polymer B, or both is at least 110° C.

3. The coextruded acrylic foil according to claim 1, wherein the acrylic polymer A, the acrylic polymer B, or both are independently a poly(meth)acrylimide comprising at least 50 wt-%, based on the weight of the poly(meth) acrylimide, of repeating units of the following formula (I):

(I)

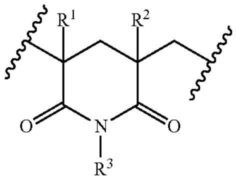

wherein $R^1$ and $R^2$ are independently selected from hydrogen and a methyl group, and $R^3$ is hydrogen or a $C_1$-$C_4$-alkyl group.

4. The coextruded acrylic foil according to claim 1, wherein the acrylic polymer A, the acrylic polymer B, or both independently have an average molar weight Mw of from 50,000 g/mol to 300,000 g/mol, determined by GPC against PMMA calibration standards and THE as an eluent, and are obtained by polymerization of a composition whose polymerizable constituents comprise, based on the weight of the polymerizable composition:

(a) from 50.0 wt. % to 99.9 wt. % of methyl methacrylate, (b) from 0.1 wt. % to 50.0 wt. % of an acrylic acid ester of a C1-C4 alcohol, (c) from 0.0 wt. % to 10.0 wt. % of at least one further monomer copolymerizable with the monomers (a) and (b).

5. The coextruded acrylic foil according to claim 1, wherein the inorganic filler in the layers A and B are independently selected from the group consisting of zirconium dioxide, titanium dioxide, silica, barium sulphate, aluminium trihydroxide, mica, zinc oxide, zinc sulphide, clay, muscovite and calcium carbonate.

6. The coextruded acrylic foil according to claim 1, wherein the colourant is a pigment or a dye.

7. The coextruded acrylic foil according to claim 1, wherein:

the foil has a thickness of from 10 μm to 200 μm;

the layer A has a thickness $d_A$ of from 5 μm to 100 μm; and the layer B has a thickness $d_B$ of from 5 μm to 100 μm.

8. The coextruded acrylic foil according to claim 1, wherein the foil has at least one selected from the group consisting of:

elongation at break, measured according to DIN EN ISO 527-3 (2019), of from 0.5% to 15%;

initial tear resistance, measured according to ASTM D1004 (2013), of from 0.1 N to 30.0 N; and resistance to tear propagation, measured according to ASTM D1938 (2019), of from 0.01 N to 1.00 N.

9. The coextruded acrylic foil according to claim 1, wherein the coextruded acrylic foil is suitable for manufacturing of a laser engravable label.

10. The coextruded acrylic foil according to claim 1, wherein the acrylic polymer A, the acrylic polymer B, or both are independently a poly(meth)acrylimide comprising a 60 wt. %, based on the weight of the poly(meth)acrylimide, of repeating units of the following formula (I):

(I)

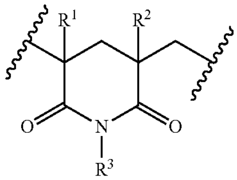

wherein $R^1$ and $R^2$ are independently selected from a methyl group, and $R^3$ is a methyl group.

11. The coextruded acrylic foil according to claim 1, wherein the inorganic filler in the layers A and B are independently selected from the group consisting of zirconium dioxide, rutile-type titanium dioxide, fused silica, barium sulphate, aluminium trihydroxide, mica, zinc oxide, zinc sulphide, clay, muscovite and calcium carbonate.

12. The coextruded acrylic foil according claim 1, wherein the colorant comprises at least one pigment selected from the group consisting of carbon black, iron oxide, cobalt oxide, aniline black and perylene black, Pigment Red 48:2, Pigment Red 48:3, Pigment Red 57:1, Pigment Red 101, Pigment Red 112, Pigment Red 122, Pigment Red 144, Pigment Red 166, Pigment Red 168, Pigment Red 178, Pigment Red 179, Pigment Red 202, Pigment Red 214, Pigment Red 254, Pigment Red 255, Pigment Red 264, Pigment Red 272, Pigment Red 276, Pigment Red 277 and Pigment Violet 19.

13. The coextruded acrylic foil according claim 1, wherein the colourant comprises at least one dye selected from the group consisting of anthraquinone dyes, perinone dyes, and monoazo dyes.

14. A laser engravable label, wherein the laser engravable label comprises at least the following layers in the following order:

a) a layer consisting of the coextruded acrylic foil according to claim 1;

b) an adhesive layer;

c) a release coating layer; and d) a support layer;

wherein the laser engravable label has a thickness of from 80 μm to 300 μm.

15. A laser engravable label, wherein the laser engravable label comprises at least the following layers in the following order:

a) a layer consisting of the coextruded acrylic foil according to claim 1, having a thickness of from 10 μm to 200 μm;

b) an adhesive layer, having a thickness of from 20 μm to 30 μm;

c) a release coating layer, having a thickness of from 0.6 μm to 0.8 μm; and d) a support layer, having a thickness of from 30 μm to 50 μm.

16. A laminate comprising at least the following layers:

a) a liner layer having initial tear resistance, measured according to ASTM D1004-13, of from 50 N to 500 N; and b) a layer consisting of the coextruded acrylic foil according to claim 1.

17. The laminate according to claim 16, wherein the liner layer consists essentially of a polymeric material selected from the group consisting of polyethylene, polypropylene, polyimide, polyethylene terephthalate and polyethylene naphthalate.

18. A process for manufacturing a laminate comprising (a) liner layer having initial tear resistance, measured according to ASTM D 1004-13, of from 50 N to 500 N, and (b) a layer consisting of the coextruded acrylic foil according to claim 1, the process comprising:

i) preparing a coextruded acrylic foil according to claim 1 using an extruder;

ii) passing the coextruded acrylic foil obtained in the preparing i) between a plurality of rolls, wherein at least one roll is a cooled roll; and iii) binding a liner layer to the coextruded acrylic foil from the passing ii), to obtain a laminate.

19. A process for manufacturing self-adhesive laser engravable labels, the process comprising:

i) preparing a coextruded acrylic foil according to claim 1 using an extruder;

ii) optionally, binding a liner layer to the coextruded acrylic foil from the preparing i) downstream of the extruder, wherein a laminate is obtained;

iii) binding an adhesive layer, optionally, a release coating layer and a support layer onto the laminate from the optional binding ii) or the coextruded acrylic foil from the preparing i), wherein a label stock is obtained; and iv) kiss cutting the label stock obtained in the binding iii) and removing the resulting waste matrix, wherein a plurality of individual self-adhesive laser engravable labels on a support layer is obtained.

* * * * *